(12) United States Patent
Shan et al.

(10) Patent No.: US 10,089,580 B2
(45) Date of Patent: Oct. 2, 2018

(54) GENERATING AND USING A KNOWLEDGE-ENHANCED MODEL

(71) Applicant: Microsoft Corporation, Redmond, WA (US)

(72) Inventors: Ying Shan, Sammamish, WA (US); Jianchang Mao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 14/456,985

(22) Filed: Aug. 11, 2014

(65) Prior Publication Data

US 2016/0042296 A1 Feb. 11, 2016

(51) Int. Cl.
*G06N 3/02* (2006.01)
*G06N 99/00* (2010.01)
*G06N 5/04* (2006.01)
*G06N 3/04* (2006.01)
*G06F 17/30* (2006.01)

(52) U.S. Cl.
CPC ..... *G06N 99/005* (2013.01); *G06F 17/30654* (2013.01); *G06F 17/30867* (2013.01); *G06N 3/02* (2013.01); *G06N 3/0454* (2013.01); *G06N 5/04* (2013.01)

(58) Field of Classification Search
CPC ........................................... G06N 3/02
USPC .......................................... 706/20
See application file for complete search history.

(56) References Cited

U.S. PATENT DOCUMENTS

| | | |
|---|---|---|
| 6,701,318 B2 | 3/2004 | Fox et al. |
| 7,542,969 B1 | 6/2009 | Rappaport et al. |
| 7,685,084 B2 | 3/2010 | Sisk et al. |
| 7,716,216 B1 | 5/2010 | Hark et al. |
| 7,818,279 B2 | 10/2010 | Liu et al. |
| 7,840,569 B2 | 11/2010 | Meyerzon et al. |
| 7,895,235 B2 | 2/2011 | Baeza-Yates et al. |
| 8,055,669 B1 | 11/2011 | Singhal et al. |

(Continued)

FOREIGN PATENT DOCUMENTS

CN 102419778 A 4/2012
WO 2013121181 A1 8/2013

OTHER PUBLICATIONS

Song et al ("Adapting Deep RankNet for Personalized Search" Feb. 2014).*

(Continued)

*Primary Examiner* — Lut Wong
(74) *Attorney, Agent, or Firm* — Rainier Patents, P.S.

(57) ABSTRACT

Functionality is described herein for generating a model on the basis of user-behavioral data and knowledge data. In one case, the user-behavioral data identifies queries submitted by users, together with selections made by the users in response to the queries. The knowledge data represents relationships among linguistic items, as expressed by one or more structured knowledge resources. The functionality leverages the knowledge data to supply information regarding semantic relationships which may not be adequately captured by the user-behavioral data, to thereby produce a more robust and accurate model (compared to a model produced on the basis of only user-behavioral data). Functionality is also described herein for applying the model, once trained. In one case, the model may correspond to a deep learning model.

20 Claims, 13 Drawing Sheets

(56) References Cited

U.S. PATENT DOCUMENTS

| | | |
|---|---|---|
| 8,229,948 B1 | 7/2012 | Ershov |
| 8,266,144 B2 | 9/2012 | Tankovich et al. |
| 8,321,431 B2 | 11/2012 | Quick et al. |
| 8,359,282 B2 | 1/2013 | Bai et al. |
| 8,392,436 B2 | 3/2013 | Bai et al. |
| 8,463,595 B1 | 6/2013 | Rehling et al. |
| 8,504,361 B2 | 8/2013 | Collobert et al. |
| 8,533,188 B2 | 9/2013 | Yan et al. |
| 8,606,786 B2 | 12/2013 | Rounthwaite et al. |
| 8,751,238 B2 | 6/2014 | James et al. |
| 8,775,442 B2 | 7/2014 | Moore et al. |
| 9,047,283 B1 | 6/2015 | Zhang et al. |
| 9,519,859 B2 | 12/2016 | Huang et al. |
| 2002/0129015 A1 | 9/2002 | Caudill et al. |
| 2004/0260695 A1 | 12/2004 | Brill |
| 2005/0004905 A1 | 1/2005 | Dresden |
| 2005/0278362 A1 | 12/2005 | Maren et al. |
| 2006/0026013 A1 | 2/2006 | Kraft |
| 2006/0277033 A1 | 12/2006 | Gao et al. |
| 2007/0124263 A1 | 5/2007 | Katariya et al. |
| 2007/0136281 A1 | 6/2007 | Li et al. |
| 2007/0203869 A1 | 8/2007 | Ramsey et al. |
| 2008/0140644 A1 | 6/2008 | Franks et al. |
| 2008/0243820 A1 | 10/2008 | Chang et al. |
| 2009/0019034 A1 | 1/2009 | Franks et al. |
| 2009/0125501 A1 | 5/2009 | Gao et al. |
| 2009/0259651 A1 | 10/2009 | Tankovich et al. |
| 2009/0276414 A1 | 11/2009 | Gao et al. |
| 2009/0282022 A1 | 11/2009 | Bennett |
| 2010/0153315 A1 | 6/2010 | Gao et al. |
| 2010/0161641 A1 | 6/2010 | Gustafson et al. |
| 2010/0250547 A1 | 9/2010 | Grefenstette et al. |
| 2010/0318531 A1 | 12/2010 | Gao et al. |
| 2011/0040752 A1 | 2/2011 | Svore et al. |
| 2011/0208709 A1 | 8/2011 | Holthausen |
| 2011/0208735 A1 | 8/2011 | Gao et al. |
| 2011/0270604 A1 | 11/2011 | Qi et al. |
| 2011/0276390 A1 | 11/2011 | Li et al. |
| 2011/0276599 A1 | 11/2011 | Connor |
| 2012/0005219 A1 | 1/2012 | Apacible et al. |
| 2012/0036015 A1 | 2/2012 | Sheikh |
| 2012/0078825 A1 | 3/2012 | Kulkarni et al. |
| 2012/0233140 A1 | 9/2012 | Collins-Thompson et al. |
| 2012/0233160 A1 | 9/2012 | Koomullil et al. |
| 2012/0253792 A1 | 10/2012 | Bespalov et al. |
| 2012/0254217 A1 | 10/2012 | Ali et al. |
| 2012/0254218 A1 | 10/2012 | Ali et al. |
| 2012/0317087 A1 | 12/2012 | Lymberopoulos et al. |
| 2012/0317088 A1 | 12/2012 | Pantel et al. |
| 2013/0103493 A1 | 4/2013 | Gao et al. |
| 2013/0124492 A1 | 5/2013 | Gao et al. |
| 2013/0159320 A1 | 6/2013 | Gao |
| 2013/0166303 A1 | 6/2013 | Chang et al. |
| 2013/0239006 A1 | 9/2013 | Tolkachev |
| 2014/0279773 A1 | 9/2014 | Chen et al. |
| 2015/0074027 A1 | 3/2015 | He et al. |
| 2015/0278200 A1 | 10/2015 | He et al. |
| 2015/0293976 A1 | 10/2015 | Guo et al. |
| 2016/0321321 A1 | 11/2016 | Huang et al. |

OTHER PUBLICATIONS

Yates et al ("Extracting Semantic Relations from Query Logs" 2007).*
Arora et al ("Semantic Searching and Ranking of Documents using Hybrid Learning System and WordNet" 2011).*
Dietze, et al., "GoWeb: a semantic search engine for the life science web", In BMC bioinformatics, Bio Med Central vol. 10, No. Suppl 10, Oct. 1, 2009, 14 Pages.
Gillani, et al., "Semantic Schema Matching Using DBpedia", In International Journal of Intelligent Systems and Applications, vol. 5, Issue 4, Mar. 2013, 9 Pages.
"International Search Report & Written Opinion Issued in PCT Application No. PCT/US2015/044540", dated Dec. 21, 2015, 13 Pages.
Huang, et al., "Learning Deep Structured Semantic Models for Web Search using Clickthrough Data," in Proceedings of the 22nd ACM International Conference on Information & Knowledge Management, Oct. 2013, 6 pages.
Zhao, et al., "Time-Dependent Semantic Similarity Measure of Queries Using Historical Click-Through Data," in Proceedings of the 15th International Conference on World Wide Web, 2006, 10 pages.
Gao, et al., "Clickthrough-Based Latent Semantic Models for Web Search," in Proceedings of the 34th International ACM SIGIR Conference on Research and Development in Information Retrieval, 2011, 10 pages.
Chien, et al., "Semantic Similarity Between Search Engine Queries Using Temporal Correlation," in Proceedings of the 14th International Conference on World Wide Web, 2005, 10 pages.
Lai, "Developing a Fuzzy Search Engine Based on Fuzzy Ontology and Semantic Search," in Proceedings of the IEEE International Conference on Fuzzy Systems, 2011, 6 pages.
Pan, et al., "Image Search by Graph-based Label Propagation with Image Representation from DNN," in Proceedings of the 21st ACM International Conference on Multimedia, Oct. 2013, 4 pages.
Shabanzadeh, et al., "A Semantic Based Query Expansion to Search," in Proceedings of International Conference on Intelligent Control and Information, in Processing, 2010, 11 pages.
Joachims, et al., "Accurately Interpreting Clickthrough Data as Implicit Feedback," in Proceedings of the 28th Annual International ACM SIGIR Conference on Research and Development in Information Retrieval, 2005, 8 pages.
Huang, et al., "A Deep Structured Semantic Model Produced Using Click-Through Data," U.S. Appl. No. 14/019,563, filed Sep. 6, 2013, 54 pages.
Diamantaras, et al., "Principal Component Neural Networks: Theory and Applications," Wiley-Interscience Publication, 1996, 255 pages.
Montavon et al., "Neural Networks. Tricks of tho Trade," Springer Publishers, 2012, 769 pages.
Maas et al., "A Probabilistic Model for Semantic Word Vectors," NIPS Workshop on Deep Learning and Unsupervised Feature Learning, 2010, 8 pages.
Chen et al., "Small-Footprint Keyword Spoiling Using Deep Neural Networks," retrieved at <<http:\\old-site.clsp.jhu.edu/~guoguo/papers/chen2014small.pdf>> on Mar. 3, 2014, 5 pages.
Volkovs, Maksims N., "Context Models for Web Search Personalization," retrieved at <<http:\\www.cs.toronto.edu/~mvolkovs/yandex_kaggle_model.pdf>> on Mar. 3, 2014, 7 pages.
Berger et al., "Information Retrieval as Statistical Translation," Proceeding of the 22nd Annual International ACM SIGIR Conference on Research and Development in Information Retrieval, Aug. 1999, 8 pages.
Deng et al., "A Deep Convolutional Neural Network Using Hetergeneous Pooling for Trading Accoustic Invariance with Phonetic Confusion," Proceedings of IEEE International Conference on Accoustics, Speech, and Signal Processing, May 2013, 5 pages.
Gao et al., "Dependence Language Model for Information Retrieval," Proceedings of the 27th Annual International ACM SIGIR Conference on Research and Development in Information Retrieval, Jul. 25-29, 2004, 8 pages.
He et al., "Discriminative Learning in Sequential Pattern Recognition," Proceedings of IEEE Signal Processing Magazine, vol. 25, Issue 5, Sep. 2008, 23 pages.
Yih et al., "Learning Discriminative Projections for Text Similarity Measures," Proceedings of the Fifteenth Conference on Computational Natural Language Learning, Jun. 2011, pp. 247-256, 10 pages.
Lu et al., "A Deep Architecture for Matching Short Texts," Proceedings of Advances in Neural Information Processing Systems, Dec. 2013, 9 pages.
Metzler et al., "A Markov Random Field Model for Term Dependencies," Proceeding of the 28th Annual International ACM SIGIR Conference on Research and Development in Information Retrieval, Aug. 15-19, 2005, 8 pages.

(56) References Cited

OTHER PUBLICATIONS

Mikolov et al., "Linguistic Regularities in Continuous Space Word Representations," Proceedings of the 2013 Conference of the North American Chapter of the Association for Computational Linguistics: Human Language Technologies, May 2013, 6 pages.
Mikolov et al., "Distributed Representations of Words and Phrases and their Compositionality," Proceedings of Advances in Neural Information Processing Systems, Oct. 16, 2013, 9 pages.
Mnih et al., "Learning word embeddings efficiently with noise-contrastive estimation," retrieved at <<papers.nips.cc/paper/5165-learning-word-embeddings-efficiently-with-noise-contrastive-estimation.pdf>>, NIPS, 9 pages.
Song et al., "A General Language Model for Information Retrieval," Proceedings of the Eighth International Conference on Information and Knowledge Management, 1999, 6 pages.
Jones, Karen Sparck, "What is the role of NLP in text retrieval?" Proceedings of Natural Language Information Retrieval Text, 1999, 19 pages.
Tur et al., "Towards Deeper Understanding: Deep Convex Networks for Semantic Utterance Classification," Proceedings of IEEE International Conference on Acoustics, Speech and Signal Processing, Mar. 2012, 4 pages.
Wang et al., "Multi-Style Language Model for Web Scale Information Retrieval," Proceedings of the 33rd International ACM SIGIR Conference on Research and Development in Information Retrieval, Jul. 19-23, 2010, 8 pages.
Zhai et al., "A Study of Smoothing Methods for Language Models Applied to Ad Hoc Information Retrieval," Proceedings of the 24th Annual International ACM SIGIR Conference on Research and Development in Information Retrieval, Sep. 9-12, 2001, 9 pages.
Mesnil et al., "Investigation of Recurrent-Neural-Network Architectures and Learning Methods for Spoken Language Understanding," Proceedings of 14th Annual Conference of the International Speech Communication Association, Aug. 25, 2013, 5 pages.
Wang et al., "Topical N-grams: Phrase and Topic Discovery, with an Application to Information Retrieval," Proceedings of the Seventh IEEE International Conference on Data Mining, 2007, 6 pages.
LV et al., "Positional Language Models for Information Retrieval," SIGIR '09, Jul. 19-23, 2009, Boston, MA, 8 pages.
Metzler et al., "Latent Concept Expansion Using Markov Random Fields," SIGIR '07, Jul. 23-27, 2007, Amsterdam, The Netherlands, 8 pages.
Buckley et al., "Automatic Routing and Retrieval Using Smart: TREC-2," Information Processing & Management, vol. 31, No. 3, 1995, pp. 315-326, 12 pages.
Cavnar et al., "N-Gram-Based Text Categorization," 1994, Proceedings of SDAIR-94, 3rd Annual Symposium on Document Analysis and Information, pp. 1-14, 14 pages.
Deng, Li, "Three Classes of Deep Learning Architectures and Their Applications: A Tutorial Survey," 2012, APSIPA Transactions on Signal and Information Processing, pp. 1-28, 28 pages.
Lin et al., "Dimensionality Reduction by Random Projection and Latent Semantic Indexing," May 2003, Proceedings of the 3rd SIAM International Conference on Data Mining and Text Mining Workshop, pp. 1-10, 10 pages.
Non-Final Office Action dated Dec. 16, 2015 from U.S. Appl. No. 14/019,563, 48 pages.
Response filed Jun. 7, 2016 to the Non-Final Office action dated Mar. 7, 2016 from U.S. Appl. No. 14/242,845, 10 pages.
Notice of Allowance dated Jul. 26, 2016 from U.S. Appl. No. 14/242,845, 29 pages.
Response filed May 26, 2016 to the Non-Final Office action dated Feb. 26, 2016 from U.S. Appl. No. 14/252,703, 12 pages.
International Preliminary Report on Patentability dated Jun. 10, 2016 from PCT Patent Application No. PCT/US2015/024417, 20 pages.
International Search Report and Written Opinion dated Jun. 18, 2015 from PCT Patent Application No. PCT/US2015/024417, 10 pages.
Notice of Allowance dated Apr. 22, 2016 from U.S. Appl. No. 14/019,563, 9 pages.
Response filed Mar. 22, 2016 to the Non-Final Office Action dated Dec. 16, 2015 from U.S. Appl. No. 14/019,563, 11 pages.
Wang et al., "Explore Click Models for Search Ranking," Proceedings of the 19th ACM International Conference on Information and Knowledge Management, Oct. 26-30, 2010, pp. 1417-1420, 4 pages.
"Researchers predict click-through behavior in Web searches," retrieved at <<http://news.psu.edu/story/178742/2009/03/11/researchers-predict-click-through-behavior-web-searches>>, Penn State News, Mar. 11, 2009, 2 pages.
Bengio, Yoshua, "Learning Deep Architectures for AI," Foundations and Trends in Machine Learning, vol. 2, Issue 1, 2009, 130 pages.
Blei et al., "Latent Dirichlet Allocation," Journal of Machine Learning Research, vol. 3, Mar. 2003, pp. 993-1022, 30 pages.
Brown et al., "The Mathematics of Statistical Machine Translation: Parameter Estimation," Computational Linguistics, vol. 19, Issue 2, Jun. 1993, pp. 263-311, 50 pages.
Burges et al., "Learning to Rank using Gradient Descent," Proceedings of the 22nd International Conference on Machine Learning, 2005, pp. 89-96, 8 pages.
Collobert et al., "Natural Language Processing (Almost) from Scratch," The Journal of Machine Learning Research, vol. 12, Feb. 2011, pp. 2493-2537, 45 pages.
Dahl et al., "Context-Dependent Pre-Trained Deep Neural Networks for Large-Vocabulary Speech Recognition," IEEE Transactions on Audio, Speech, and Language Processing, vol. 20, Issue 1, Jan. 20121 pp. 30-42, 13 pages.
Deerwester et al., "Indexing by Latent Semantic Analysis," Journal of the American Society for Information Science, vol. 41, Issue 6, Sep. 1990, 34 pages.
Dumais et al., "Automatic Cross-Language Retrieval Using Latent Semantic Indexing," Proceedings of AAAI Spring Symposium Series: Cross-Language Text and Speech Retrieval, Mar. 24-26, 1997, 7 pages.
Gao et al., "Clickthrough-Based Translation Models for Web Search: from Word Models to Phrase Models," Proceedings of the 19th ACM International Conference on Information and Knowledge Management, Oct. 26-30, 2010, pp. 1139-1148, 10 pages.
Heck et al., "Robustness to telephone handset distortion in speaker recognition by discriminative feature design," Speech Communication, vol. 31, Elsevier Science B.V., 2000, pp. 181-192, 12 pages.
Gao et al., "Smoothing Clickthrough Data for Web Search Ranking," Proceedings of the 32nd International ACM SIGIR Conference on Research and Development in Information Retrieval, Jul. 19-23, 2009, pp. 355-362, 8 pages.
Girolami et al., "On an Equivalence between PLSI and LDA," Proceedings of the 26th Annual International ACM SIGIR Conference on Research and Development in Information Retrieval, Jul. 2003, pp. 433-434, 2 pages.
Hinton et al., "Deep Neural Networks for Acoustic Modeling in Speech Recognition," Magazine of IEEE Signal Processing, Nov. 2012, pp. 82-97, 16 pages.
Hinton et al., "Discovering Binary Codes for Documents by Learning Deep Generative Models," Proceedings of Topics in Cognitive Science, 2010, 18 pages.
Hofmann, Thomas, "Probabilistic Latent Semantic Indexing," Proceedings of the 22nd Annual International ACM SIGIR Conference on Research and Development in Information Retrieval, Aug. 1999, pp. 50-57, 8 pages.
Jarvelin et al., "IR evaluation methods for retrieving highly relevant documents," Proceedings of the 23rd Annual International ACM SIGIR Conference on Research and Development in Information Retrieval, Jul. 2000, pp. 41-48, 8 pages.
Li et al., "Very Sparse Random Projections," Proceedings of the 12th ACM SIGKDD International Conference on Knowledge Discovery and Data Mining, Aug. 20-23, 2006, pp. 287-296, 10 pages.
Platt et al., "Translingual Document Representations from Discriminative Projections," Proceedings of the Conference on Empirical Methods in Natural Language Processing, Oct. 2010, pp. 251-261, 11 pages.

(56) References Cited

OTHER PUBLICATIONS

Salakhutdinov et al., "Semantic Hashing," IRGM Workshop at the SIGIR Conference, Jun. 2007, 8 pages.
Socher et al., "Semantic Compositionality through Recursive Matrix-Vector Spaces," Proceedings of the Joint Conference on Empirical Methods in Natural Language Processing and Computational Natural Language Learning, Jul. 2012, pp. 1201-1211, 11 pages.
Svore et al., "A Machine Learning Approach for Improved BM25 Retrieval," Proceedings of the 18th ACM Conference on Information and Knowledge Management, Nov. 2009, pp. 1811-1814, 4 pages.
Wei et al., "LDA-Based Document Models for Ad-hoc Retrieval," Proceedings of the 29th Annual International ACM SIGIR Conference on Research and Development in Information Retrieval, Aug. 6-11, 2006, pp. 178-185, 8 pages.
Konig et al., "Nonlinear Discriminant Feature Extraction for Robust Text-Independent Speaker Recognition," Proceedings of the RLA2C, 1998, 4 pages.
Zeiler et al., "Adaptive Deconvolutional Networks for Mid and High Level Feature Learning," IEEE International Conference on Computer Vision, Nov. 2011, pp. 2018-2025, 8 pages.
Bendersky et al., "Parameterized Concept Weighting in Verbose Queries," SIGIR'11, Jul. 24-28, 2011, Beijing, China, 10 pages.
Deng et al., "Deep Stacking Networks for Information Retrieval," IEEE International Conference on Acoustics, Speech, and Signal Processing (ICASSP), 2013, 5 pages.
Gao et al., "Learning Continuous Phrase Representations for Translation Modeling," ACL, 2014, 11 pages.
Gao et al., "Modeling Interestingness with Deep Neural Networks," EMNLP, Oct. 25-29, 2014, Doha, Qatar, 12 pages.
Shen et al., "A Latent Semantic Model with Convolutional-Pooling Structure for Informational Retrieval," CIKM'14, Nov. 3-7, 2014, Shanghai, China, 10 pages.
Shen et al., "Learning Semantic Representations Using Convolutional Neural Networks for Web Search," WWW'14 Companion, Apr. 7-11, 2014, Seoul, Korea, 2 pages.
Non-Final Office Action and Examiner-Initiated Interview Summary dated Mar. 7, 2016 from U.S. Appl. No. 14/242,845, 31 pages.
Non-Final Office Action dated Feb. 26, 2016 from U.S. Appl. No. 14/242,703, 28 pages.
PCT Chapter II Demand and Response filed Oct. 30, 2015 from PCT Patent Application No. PCT/US2015/024417, 21 pages.
Preliminary Amendment filed Jul. 13, 2016 from U.S. Appl. No. 15/207,896, 6 pages.
Non-Final Office Action dated Nov. 30, 2016 from U.S. Appl. No. 15/207,896, 47 pages.
Notice of Allowance and Examiner-Initiated Interview Summary dated Sep. 7, 2016 from U.S. Appl. No. 14/252,703, 24 pages.
Hutchinson et al., "Tensor Deep Stacking Networks," IEEE Transactions on Pattern Analysis and Machine Intelligence, vol. 35, No. 8, Aug. 2013, 14 pages.
Lavrenko et al., "Relevance-Based Language Models," SIGIR '01, Sep. 9-12, 2001, New Orleans, Louisiana, 8 pages.
"Amendment Filed in Chinese Patent Application No. 201580043229.6", Filed Date: Sep. 1, 2017, 17 pages.
Response filed Feb. 23, 2017 to the Non-Final Office Action dated Nov. 30, 2016 from U.S. Appl. No. 15/207,896, 11 pages.
International Preliminary Report on Patentability dated Feb. 23, 2017 from PCT Patent Application No. PCT/US2015/044540, 7 pages.
Communication pursuant to Rules 161(1) and 162 EPC dated Mar. 17, 2017 from European Patent Application No. 15754341.4, 2 pages.
Second Written Opinion dated Mar. 14, 2016 from PCT Patent Application No. PCT/US2015/024417, 6 pages.
Final Office Action dated Jun. 27, 2017 from U.S. Appl. No. 15/207,896, 31 pages.

* cited by examiner

GENERATING AND USING A KNOWLEDGE-ENHANCED MODEL

BACKGROUND

A typical commercial search engine may employ a model that is produced in a machine-learning process. The machine-learning process may train the model on the basis of click-through data. The click-through data, in turn, identifies queries submitted by users, together with selections (e.g., "clicks") made by the users in response to the queries.

SUMMARY

Computer-implemented functionality is described herein for generating a model, using a machine-learning process, on the basis of user-behavioral data and knowledge data. The user-behavioral data identifies linguistic items submitted by users, together with selections made by the users in response to the linguistic items. For example, the user-behavioral data may correspond to click-through data, including queries submitted by users together with click selections made by the users in response to the queries. The knowledge data represents relationships among linguistic items, as expressed by one or more structured knowledge resources. The functionality leverages the knowledge data to supply information regarding semantic relationships which may not be adequately captured by the user-behavioral data, thus producing a model that is more accurate and robust compared to a model that is trained solely on the basis of user-behavioral data.

This disclosure also pertains to the model produced in the above-summarized matter, as well as functionality for applying the model within a search engine.

According to one non-limiting implementation, the model corresponds to a deep learning model. The deep learning model uses multiple levels of analysis to transform each linguistic input item into a concept vector. The concept vector expresses the high-level meaning of the linguistic input item within a semantic space.

The above approach can be manifested in various types of systems, components, methods, computer readable storage media, data structures, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative computer-implemented functionality for producing a model based on different types of training data, and then applying the model to determine a degree of relatedness between at least two linguistic items. Section B sets forth illustrative methods which explain the operation of the functionality of Section A. Section C describes illustrative computing functionality that can be used to implement any aspect of the features described in Sections A and B.

Figure 15:
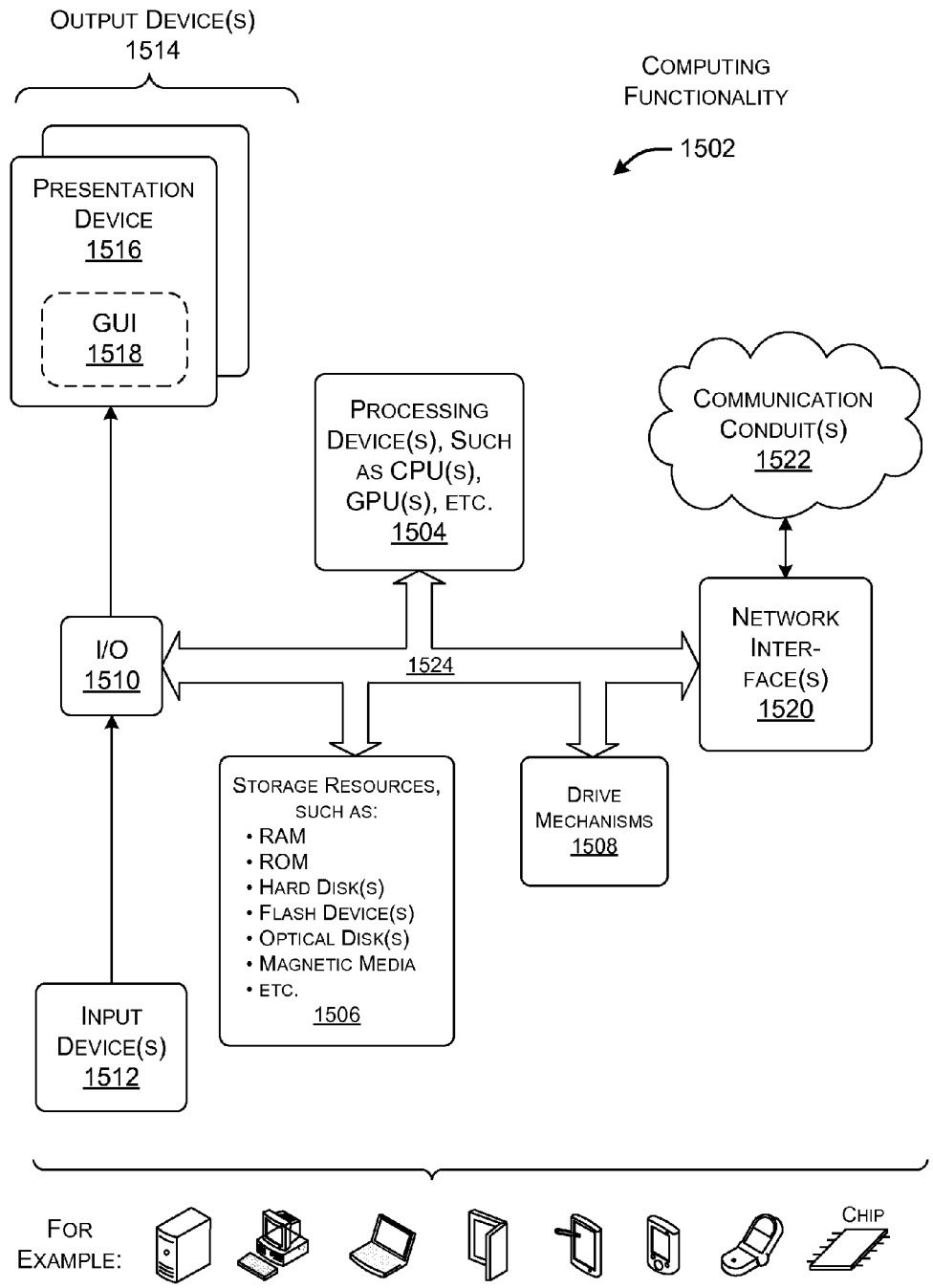
FIG. 15 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 15, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Finally, the terms "exemplary" or "illustrative" refer to one implementation among potentially many implementations.

A. Illustrative Functionality

A.1. Overview

Figure 1:
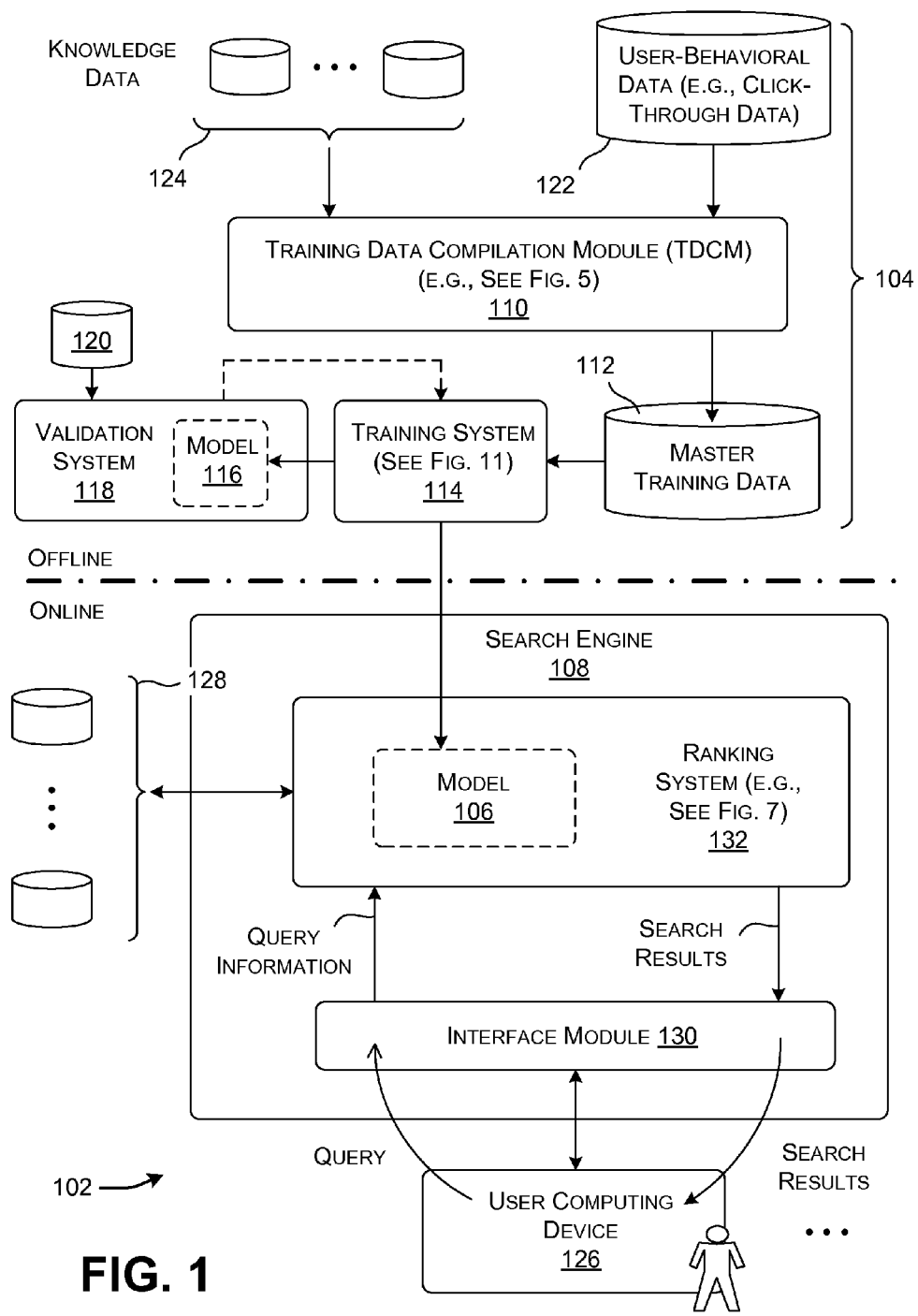
FIG. 1 shows an illustrative environment for generating and applying a model, such as, but not limited to, a deep learning model. The model is produced based on a combination of user-behavioral data and knowledge data.

FIG. 1 shows an environment 102 that includes a training framework 104 for producing a model 106 based on a machine-learning process. In one non-limiting implementation, the model 106 corresponds to a deep learning model. The deep learning model operates by projecting linguistic input items into concept vectors expressed in a semantic space, using a multi-layer analysis framework. Subsection A.3 (below) describes the composition and application of one type of deep learning model; that particular model includes a preliminary hashing layer in combination with a multi-level deep neural network (DNN). In other cases, the model 106 may correspond to another type of deep learning model, such as a convolutional model. In other cases, the model 106 may correspond to any other type of model produced in a machine-learning process (not limited to a deep learning model), such as a linear model, a decision tree model, a random forest model, a clustering-based model, a probabilistic graphical model (such as a Bayesian hierarchical model), and so on.

As the term is generally used herein, a linguistic item corresponds to any information-bearing item that is expressed in any natural language and/or other symbolic framework, composed of a sequence of one or more words and/or other symbols. A linguistic item may also include non-linguistic content as part thereof, such as picture content, etc.

Different systems may make use of the model 106. In one example, a search engine 108 receives an input linguistic item from a user, such as a query. The search engine 108 uses the model 106 to select zero, one or more output linguistic items (such as documents) that are relevant to the input linguistic item. The search engine 108 may then rank the output items and deliver the output items to the user.

Referring first to the training framework 104, a training data compilation module (TDCM) 110 generates a set of master training data. A data store 112 stores the master training data. (In all cases herein, the term "data store" may correspond to one or more underlying physical storage mechanisms, provided at a single site or distributed over plural sites.) A training system 114 then uses any type of machine learning process to generate a provisional model 116 based on the master training data. Subsection A.2, below, provides additional details regarding the TDCM 110. Subsection A.4 provides additional details regarding the training system 114.

A validation system 118 may determine the accuracy of the provisional model 116 based on hold-out training data within a data store 120. If the validation system 118 determines that the provisional model 116 is not producing output results of sufficient accuracy, a model developer may use the training system 114 to generate another model. That is, the training system 114 may produce the new model based on additional master training data and/or based on different parameter value selections, etc. The training framework 104 can repeat the above procedure one or more times until it produces the final model 106 having a satisfactory accuracy and robustness. The model developer may then deploy the model 106 in the search engine 108 (or other application setting) for real-time use in processing user queries.

In operation, the TDCM 110 culls the master training data from at least two sources. As a first source, the TDCM 110 receives user-behavioral data from a repository 122 (e.g., a data store) of such data. The user-behavioral data describes linguistic items submitted by users together with actions taken by the users in response to the linguistic items. For example, the user-behavioral data may correspond to click-through data extracted from a click log maintained by any search engine, such as search engine 108. The click-through data identifies queries submitted by users, together with click selections made by the users in response to the queries. As used herein, a "click" broadly describes any manner by which a user may express interest in an item, such as a document. For example, in some cases, a user may select an item in a search results page by explicitly clicking on it using a mouse device or the like, or touching it on a touch sensitive user interface presentation, etc. In other cases, a user may select an item by hovering over it using any input device. In other cases, a user may select an item by performing some transaction that pertains to the item, such as by filling out a survey, purchasing a corresponding product, and so on.

As a second source, the TDCM 110 receives knowledge data from one or more structured knowledge resources, provided in one or more data stores 124. A structured knowledge resource represents any type of data structure that represents relationships among items. For example, one type of structured knowledge resource may correspond to the WordNet knowledge resource produced by Princeton University of Princeton, N.J. The WordNet knowledge resource identifies sets of synonyms (referred to as synsets), and semantic relationships among the sets. An instance of knowledge data, as the term is used herein, represents (at least in part) information extracted from at least one structured knowledge resource. For example, an instance of knowledge data may represent at least two synonymous terms extracted from a synset of the WordNet knowledge resource. Subsection A.2 (below) provides additional information regarding different types of structured knowledge resources that may be used within the environment 102 of FIG. 1; that subsection also describes techniques for sampling knowledge data from the resources.

As will also be described in Subsection A.2, the TDCM 110 transforms the user-behavioral data and the knowledge data into a consistent format, to produce consistent user-behavioral data and consistent knowledge data. For example, in one case, the TDCM 110 can convert the knowledge data into the same format as the user-behavioral data.

Now referring to the search engine 108, in one implementation, the search engine 108 represents functionality that is implemented by one or more remote computing devices (where "remote" refers to the location of the search engine 108 with reference to a user who interacts with the search engine 108). In that case, the user may interact with the search engine 108 via a local user computing device 126 of any type. In another case, the search engine 108 represents a local resource provided by the local user computing device 126. For example, as the term is broadly used herein, the search engine 108 may represent a retrieval engine that is associated with a particular application, or an operating system, etc. In still other cases, the functionality associated with the search engine 108 may be distributed between remote and local resources in any manner.

In one manner of operation, the search engine 108 receives an input query from the user. The input query may represent any input linguistic item, such as one or more keywords specified by the user. In addition, or alternatively, the input query may include context information that identifies a context in which the user has entered the query. For example, the context information may specify the location of the user, the demographic characteristics of the user, the interests of the user, and so on. (As described in Section C, the environment 102 adopts appropriate privacy-related safeguards with respect to its storage and use of any such user data.)

The search engine 108 uses the model 106 to identify zero, one, or more output linguistic items that are relevant to the input query. For instance, an output linguistic item may correspond to a document or a portion of a document, etc. The term document, in turn, encompasses a wide variety of text-bearing linguistic items, including documents produced by word processing programs of any type, Email messages, images and videos having textual tags or annotations, web pages or other Internet-accessible content items, advertisements, and so on. In other cases, a document may correspond to any record in any type of data structure, or in any unstructured repository of records. For example, a document may correspond to an entry within a table, a node associated with a knowledge graph, and so on. For instance, in one case, a document may pertain to an entity, e.g., a person, place, company, etc. identified by an enterprise graph.

The search engine 108 may retrieve the target documents from one or more data stores 128. The data stores 128 may be remote and/or local with respect to the location of the user. For example, the data stores 128 may represent distributed resources that are accessible through a wide area network, such as the Internet.

In one implementation, the search engine 108 may include, or be conceptualized as including, an interface module 130 and a ranking system 132. The interface module 130 represents whatever functionality that the search engine 108 uses to interact with a user. For example, the interface module 130 may provide a page through which the user may enter his or her query, and one or more pages which deliver the search results which have been determined as being relevant to the user's query. The ranking system 132 provides functionality that compares the user's query with the documents in the data stores 128. Subsection A.3 (below) provides additional information regarding one manner of operation of the ranking system 132, according to one non-limiting implementation.

In other implementations, the search engine 108 can perform other respective functions. For example, in one alternative application, the user may designate a part of a document or an entire document as a first linguistic item. The user may then leverage the search engine 108 to find other document parts or documents that are related to the first linguistic item. Or the search engine 108 may be more generally employed to find clusters of related linguistic items, etc.

Overall, from a high-level perspective, the training framework 104 leverages the use of knowledge data to supplement any deficiencies in the click-through data. As a result, the model 106 produced by the training framework 104 may generate more accurate and robust results, compared to a model which is trained based solely on the click-through data. The user benefits from the model 106 by locating desired information in a time-efficient manner, e.g., because the user may reduce the number of queries that are needed to identify useful information. The search engine 108 benefits from the model 106 by handling user search sessions in a resource-efficient manner, again due its ability to more quickly identify relevant search results in the course of user search sessions. For instance, the model 106 may contribute to the search engine's efficient use of its processing and memory resources.

Figure 2:
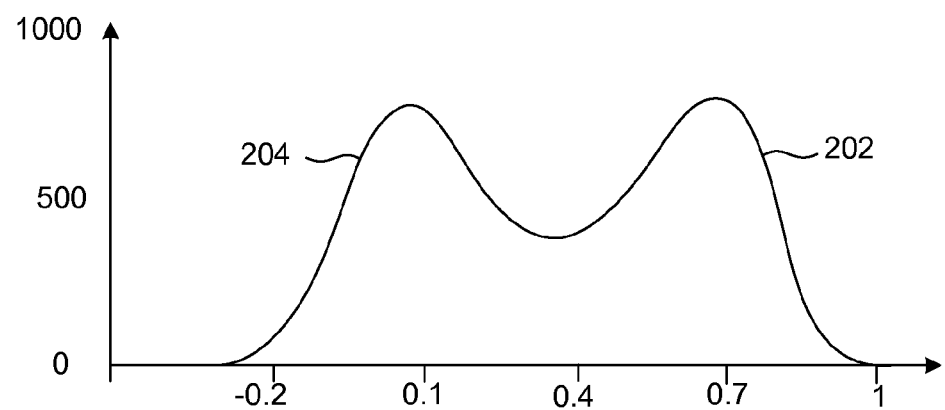
FIG. 2 shows a histogram that represents the performance of a model that is trained with only click-through data.
Figure 3:
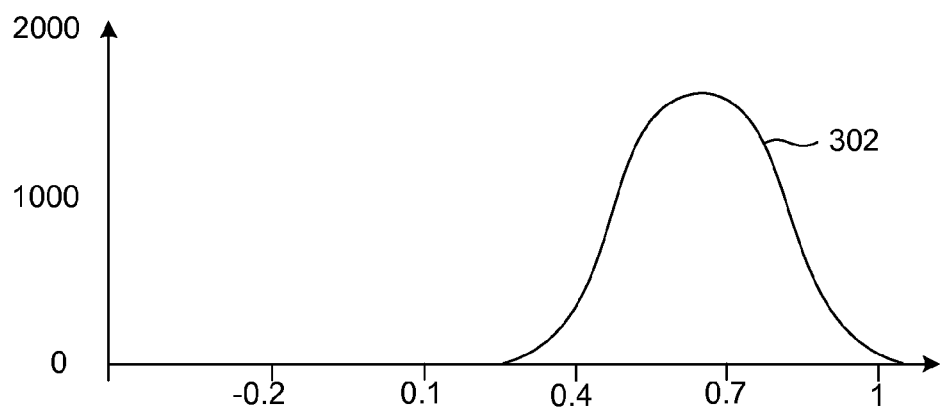
FIG. 3 shows a histogram that represents the performance of a model that is trained with both click-through data and knowledge data.

The histograms of FIGS. 2 and 3 demonstrate the advantage of injecting knowledge data into the training set. That is, FIG. 2 represents the performance of a model that is built using click-through data, but not knowledge data; FIG. 3, by contrast, represents the performance of a model that is built using both click-through data and knowledge data. Each graph represents the performance of its model when applied to a corpus of pairs of linguistic items, each which has been determined, a-priori, to be related. For example, the corpus of linguistic items may correspond to pairs of synonyms identified in a structured knowledge resource, such as the WordNet knowledge resource. Each point on the horizontal axis represents a relevance score generated by the model. Each point on the vertical axis represents a number of pairs of linguistic items within the corpus that share a particular relevance score.

Referring first to FIG. 2, this figure shows a right-most hump 202 and a left-most hump 204. The right-most hump 202 corresponds to a first subset of pairs in the training data that have relatively high relevance scores, representing a conclusion that the terms in the respective pairs are related to each other. The model performs well with respect to the right-most hump 202 because the pairs of items associated with that portion are adequately represented by the click-through data. The left-most hump 204, by contrast, corresponds to a second subset of pairs in the training data that have relatively low relevance scores, representing a conclusion that terms in the respective pairs are not related, or at least not strongly related. The model does not perform well with respect to the left-most hump 204 because the pairs of items associated with that portion are not adequately captured by the click-through data. The deficiency associated with the left-most hump 204 may be particularly pronounced when the corpus of click-through data is small in size or otherwise limited in its scope, e.g., because a sufficient amount of historical data has not yet been compiled.

To understand the potential shortcoming of the model of FIG. 2, consider the origin of the click-through data that is used to produce the model. In one case, the user selects from among output items identified in search results, e.g., by "clicking" on those items. A search engine, in turn, generates the search results based on some ranking algorithm. As a result, the users' clicks implicitly reflect or embody whatever ranking analysis is performed by the search engine. As a further consequence, the model that is generated based on the click-through data may have the net effect of reinforcing the logic of the ranking analysis, or, in other words, reinforcing the relationships that the ranking analysis already knows about. Again, this outcome can be observed in the right-most hump 202, which corresponds to pairs in the training data that have relatively high relevance scores. The model may perform less successfully in discovering relationships that are not well represented by the output items presented in the search results. This outcome can be observed in the relatively low relevance scores in the left-most hump 204, which corresponds to semantically related pairs in a knowledge base that did not appear in the training data.

In contrast, FIG. 3 shows a single hump 302, corresponding to pairs in the training data that have relatively high relevance scores, reflecting a conclusion that the terms in the respective pairs are related. The success of the model in the case of FIG. 3 ensues from its use of the knowledge data in combination with the click-through data. The knowledge data supplies relevant training examples that may be missing in the click-through data, so that the overall model that is produced canvasses a broader range of examples compared to the case of FIG. 2. As a final result, the model is more successful (compared to the case of FIG. 2) in discovering new semantic relationships that are not represented by the click-through data alone.

Figure 4:
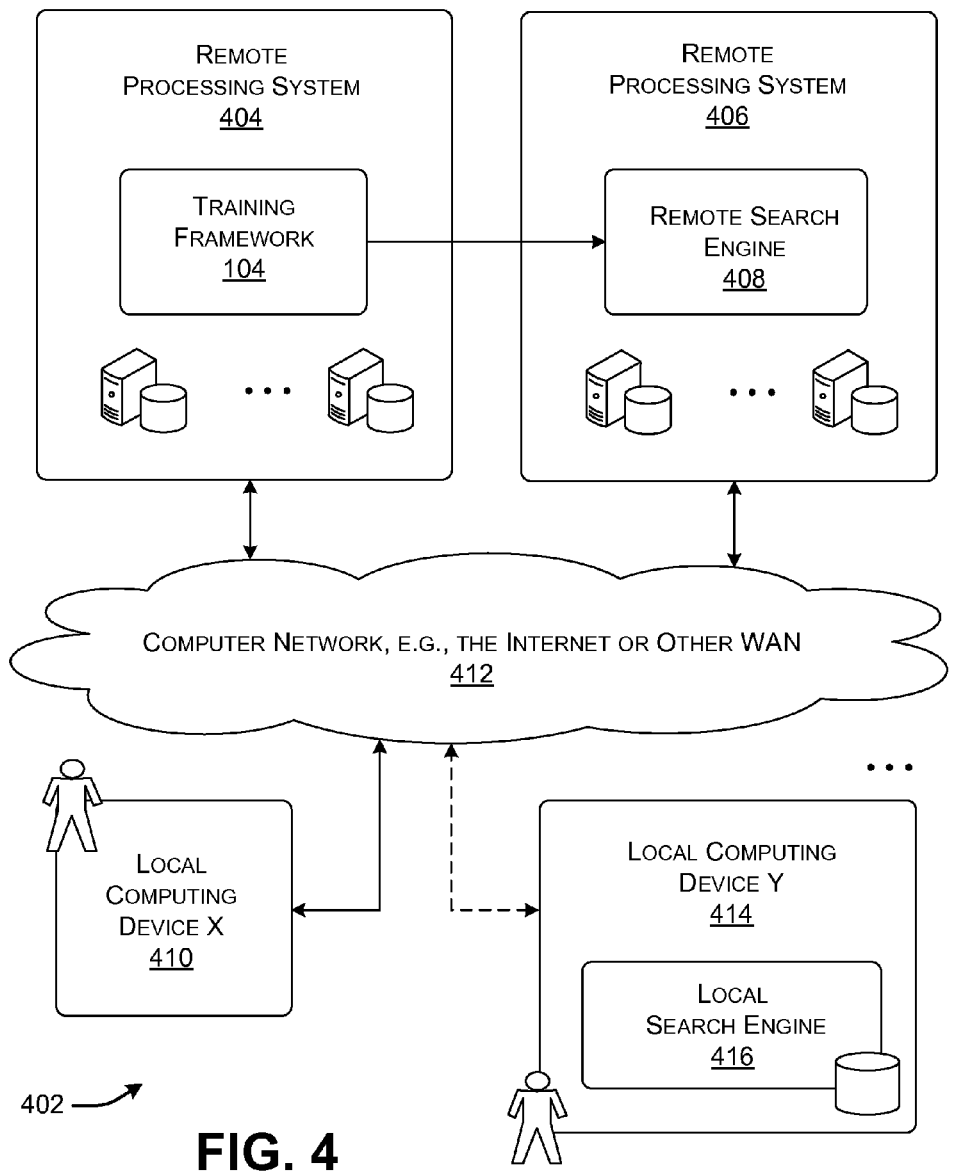
FIG. 4 shows a computer system that represents one implementation of the environment of FIG. 1.

FIG. 4 shows a computer system 402 that represents one implementation of the environment 102 of FIG. 1. The computer system 402 may include a remote processing system 404 that implements the training framework 104, and a remote processing system 406 that implements a remote search engine 408. Each remote processing system (404, 406) may physically correspond to one or more server computing devices, one or more data stores, and/or other computing equipment; such computing resources may be provided at a single site, or may be distributed over plural sites. In one case, the remote processing system 404 and the remote processing system 406 may represent two parts of a single overall system, administered by a single entity. In another case, the remote processing system 404 and the remote processing system 406 may represent two different systems, implemented by the same entity or two different entities.

Users may interact with the search engine 408 (provided by the remote processing system 406) using respective user devices, such as the representative user computing device 410. Each user computing device may correspond to any of: a personal computing device of any type, a tablet-type computing device, a smartphone, an electronic media consumption device, a game console, a set-top box, a wearable computing device, and so on.

A computer network 412 couples the local computing devices with the search engine 108 provided by the remote processing system 406. The computer network 412 may correspond to a wide area network (e.g., the Internet), a local area network, one or more point-to-point links, and so on, or any combination thereof.

In another case, a user may interact with another user computing device 414 which hosts a local search engine 416; in that case, the search engine 416 may alternatively be referred to as a retrieval engine. In another case, aspects of the search engine 108 of FIG. 1 may be distributed between a local user computing device and the remote processing system 406 in any manner.

A.2. The Training Data Compilation Module (TDCM)

Figure 5:
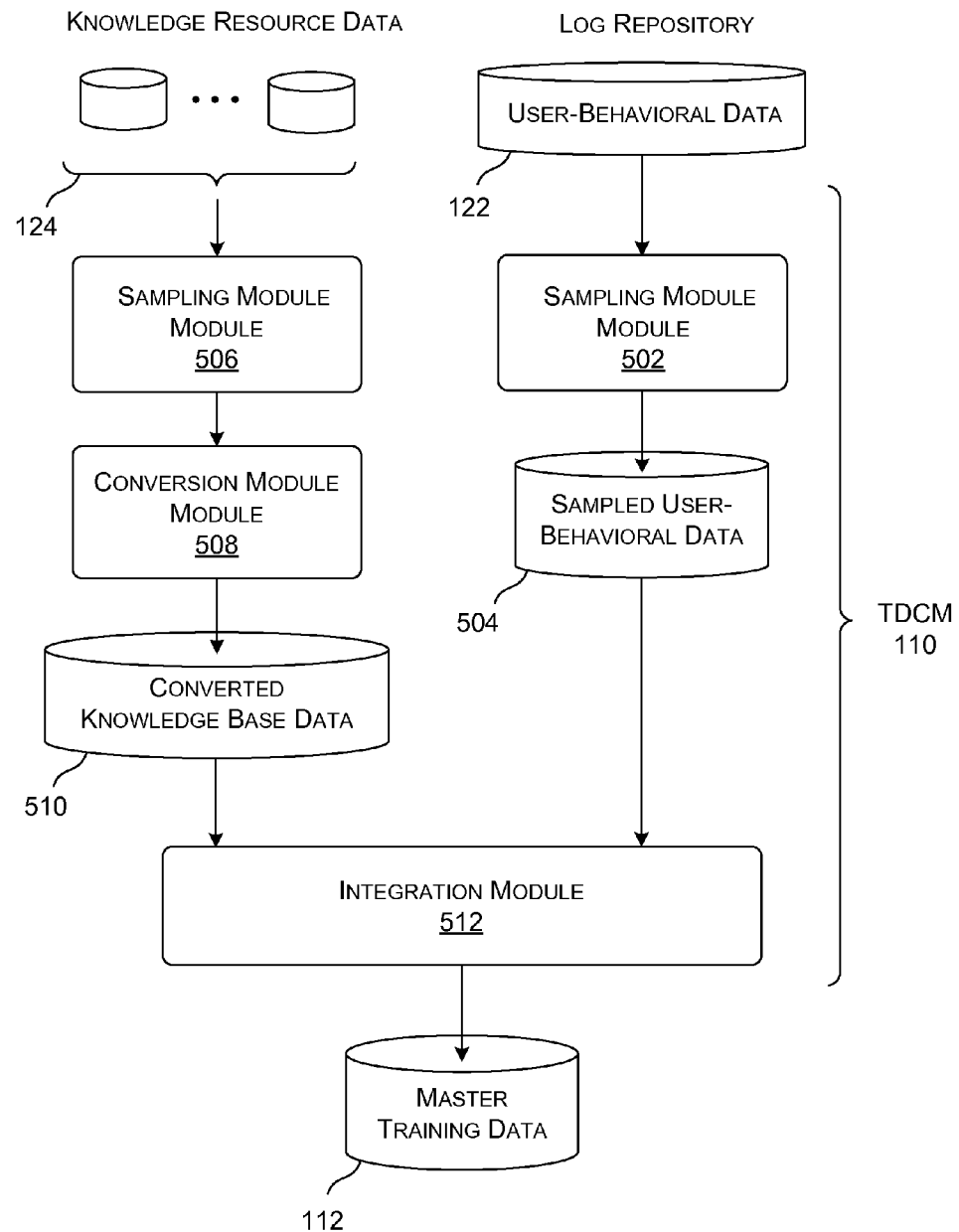
FIG. 5 shows one implementation of a training data compilation module (TDCM), which is a component of the environment of FIG. 1. The TDCM generates master training data for use in training the model. The master training data, in turn, is produced based on user-behavioral data and knowledge data.

FIG. 5 shows one implementation of the training data compilation module (TDCM) 110. As stated above, the TDCM 110 generates master training data for use in training the model 106. As also explained above, the TDCM 110 receives user-behavioral data (e.g., click-through data) from a repository 122 of user-behavioral data, and knowledge data from one or structured knowledge resources, maintained in one or more data stores 124.

The user-behavioral repository 122 may be administered by any functionality. In one case, a search engine, such the Bing® search engine produced by Microsoft® Corporation of Redmond, Wash., produces the user-behavioral repository 122. In one example, the user-behavioral data in that repository 122 provides historical records of queries submitted by users, together with an indication of actions (e.g., clicks, non-clicks, etc.) that the users made in response to submitting those queries. (As described in Section C, the environment 102 adopts various privacy-related safeguards with respect to the collection and application of such user data.)

Each structured knowledge resource can include any type of ontology that organizes any linguistic items using any data structure. Illustrative data structures include hierarchies, lists, tables, graphs, etc. Further, any technique may be used to create a structured knowledge resource. For example, in some cases, one or more experts may manually create a structured knowledge resource. In other cases, a crowdsourcing workforce may create a structured knowledge resource, e.g., by defining the relationships among linguistic items in the structured knowledge resource. In some cases, the environment 102 of FIG. 1 can rely on pre-existing, publicly available, structured knowledge resources. In addition, or alternatively, the environment 102 can rely on its own custom-generated structured knowledge resource(s).

Figure 6:
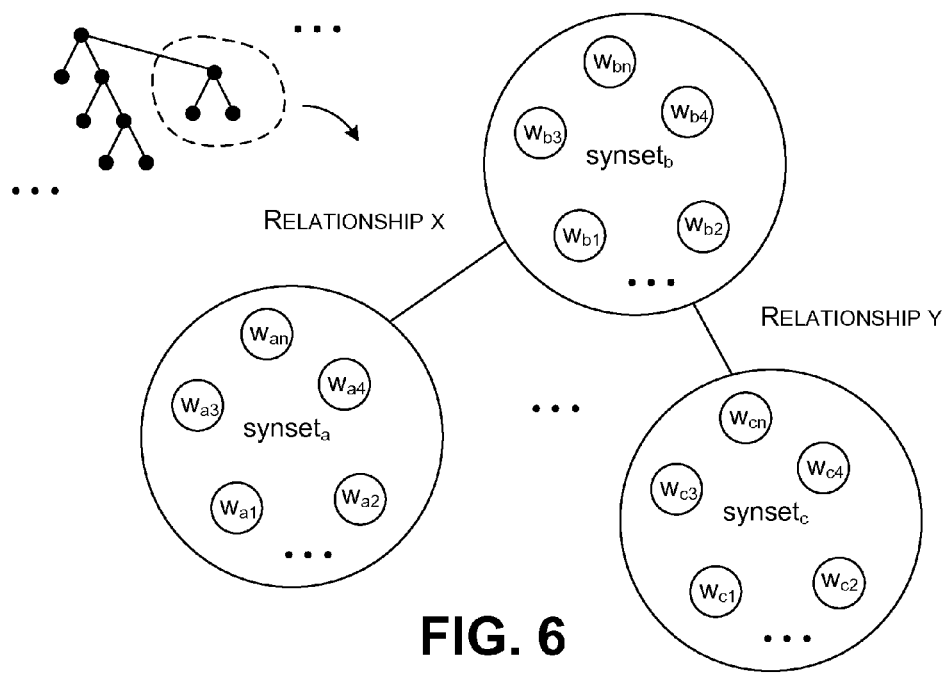
FIG. 6 shows an example of the structure of one type of structured knowledge resource.

As described above, one of the structured knowledge resources may correspond to the WordNet resource. As conceptually depicted in FIG. 6, the WordNet structured knowledge resource provides a hierarchy of nodes associated with respective concepts. Each node, in turn, corresponds to a set of synonyms, referred to as a synset. For example, FIG. 6 shows three representative synsets in a hierarchy of such sunsets. The $synset_a$ includes a collection of synonymous words $\{w_{a1}, w_{a2}, \ldots, W_{an}\}$; $synset_b$ includes a collection of words $\{w_{b1}, w_{b2}, \ldots, w_{bn}\}$; $synset_c$ includes a collection of words $\{w_{c1}, w_{c2}, \ldots, w_{cn}\}$, and so on.

The WordNet resource may also provide links which connect the different synsets together. Each link represents the semantic relationship between two linked synsets. For example, a child synset may be coupled to a parent synset by a link; that link indicates that the child synset is a species of a more general concept associated with the parent synset.

In addition, the WordNet resource can store a similarity measure for each pairing of words in its ontology. The similarity measure describes the extent of semantic relatedness between the words. The similarity measure can also be conceptualized as the semantic distance d between the two words. In one configuration, for instance, two words that are relatively far apart are not closely related; two words that are relatively close together are closely related.

To repeat, the WordNet structure knowledge resource represents just one possible resource from which knowledge data may be obtained. For instance, in addition, or alternatively, the TDCM 110 can obtain knowledge data from any of: the DMOZ resource maintained by the Open Directory Project (ODP) community; the DBPedia directory associated with the Wikipedia site; the Satori knowledge resource provided by Microsoft® Corporation of Redmond, Wash.; any product catalogue, and so on. The DMOZ resource provides an ontology that categories the links accessible via the World Wide Web (WWW). The DBPedia resource provides an ontology of content found on the Wikipedia collaborative encyclopedia site. The Satori knowledge resource provides a graph that provides information regarding entities and the relationships among entities, extracted from various sources. A product catalogue provides an ontology which classifies goods and/or service that are available for sale, and so on. These structured knowledge resources are cited by way of example, not limitation; the environment 102 of FIG. 1 may rely on yet other types of structured knowledge resources, not specifically mentioned above.

Returning to FIG. 5, the TDCM 110 includes a first sampling module 502 for sampling user-behavioral data from the repository 122, to produce sampled user-behavioral data. The first sampling module 502 may perform this sampling in any manner, e.g., by randomly selecting a subset of historical data maintained in the repository 122. Alternatively, or in addition, the first sampling module 502 can cull historical data from the repository 122 that represents a desired distribution of query topics, and so on. The first sampling module 502 may store the sampled user-behavioral data in a data store 504.

In one case, an instance of user-behavioral data may correspond to a set of data $\{Q, A, c, w\}$. Q represents a query submitted by a user. A represents a candidate answer that the user may or may not have selected. c represents an indication of whether the user clicked on the answer A in response to submission of the query Q. For example, the value 1 may indicate a click, while the value 0 may indicate the absence of a click. The optional w variable represents a weight associated the user's click. For example, the weight may indicate the number of times the set $\{Q, A, c\}$ appears within the training data that has been collected. That is, the sampling module 502 can condense duplicate query-click events into a single record by leveraging the w variable. In other cases, the sampling module 502 may store duplicate versions of the same query-answer-click set without condensing them into a single record, and thereby avoiding the use of the w variable.

With respect to the click variable c, in some cases, a 0 value may indicate that a user was explicitly presented with an opportunity to select a target linguistic item, but declined to make such a selection. For example, the 0 value may indicate that a search engine provided a candidate document to the user for his or her consideration in response to the submission of a query, yet the user failed to click on that particular answer. In another case, the sampling module 502 can "artificially" produce a non-click event by randomly selecting any answer from a database of possible answers, providing that the user did not actually click on that answer in response to submitting his or her query. But in that latter case, there is no requirement that the answer was actually presented to the user for his or her consideration. The first sampling module 502 can extract the unrelated ("negative") query-answer pairs prior to the training operation, and/or in an on-demand manner during the training operation.

A second sampling module 506 may sample knowledge data from one or more structured knowledge resources, to produce sampled knowledge data. The second sampling module 506 can use any administrator-configurable rules to perform this sampling task. For example, in one merely illustrative case, the second sampling module 506 can extract pairs of related nouns from the WordNet resource described above. Relatedness can be assessed in different ways. In one approach, the second sampling module 506 can determine that two nouns are related if the semantic distance between them (corresponding to a similarity measure provided by the WordNet resource) is smaller than a prescribed threshold. In another approach, the second sampling module 506 can determine that two nouns are related if they originate from the same synset. For example, with reference to FIG. 6, the second sampling module 506 can extract one or more pairs from $synset_a$, one or more pairs from $synset_b$, one or more pairs from $synset_c$, and so on.

The second sampling module 506 can also extract pairs of unrelated linguistic items in any manner. For example, assume that the second sampling module 506 first determines that the nouns "dog" and "canine" are related, based on information extracted from a structured knowledge resource. The word "dog" serves as a proxy for a query, while the word "canine" serves as a proxy for a document that matches the query. The second sampling module 506 can next pick at least one noun (e.g., "bicycle") that is presumed to be unrelated to the noun "dog." The word "bicycle" serves as a proxy for a document that the user did not click on in response to the query "dog."

For example, the second sampling module 506 can determine that two nouns are unrelated if the distance between them (as reflected by the similarity measure provided by the WordNet resource) is greater than a threshold distance. In another approach, the second sampling module 506 can determine that two nouns are unrelated if they are antonyms of each other (which is information provided by the WordNet resource). In another approach, the second sampling module 506 can determine that two nouns are unrelated if they originate from different synsets. In another approach, the second sampling module 506 can determine that two nouns are unrelated if they are randomly selected from the structured knowledge resource. For example, again assume that the second sampling module 506 first determines that the nouns "dog" and "canine" are related, based on information extracted from the structured knowledge resource. The second sampling module 506 can next randomly pick another word from the structured knowledge resource, under the assumption that the randomly picked word will be unrelated to "dog." Such a conclusion (that the pair will be unrelated) may not be true in every case, but will be true on average if there is a large pool of nouns from which to choose. Or the second sampling module 506 can perform a follow-up step of excluding those pairs of randomly selected nouns that the structured knowledge resource indicates are, in fact, related. Still other approaches are possible for selecting unrelated pairs of nouns.

Different structured knowledge resources (other than the WordNet resource) may identify similarity among linguistic items in other ways, compared to those specified above. The second sampling module 506 can accordingly apply different sampling techniques for different respective structured knowledge resources. For example, consider a product catalogue that identifies a subset of products that share one or more common characteristics, such as types of wines that originate from a particular region or vineyard. The second sampling module 506 can select pairs of items from this subset under the assumption that these items are semantically related.

As a result of the above processing, the second sampling module 506 produces sampled knowledge data that may include a subset of related items and a subset of unrelated items. For example, one pair of related items extracted from an entity graph may correspond to the nouns "Baltimore" and "Charm City," where "Charm City" is the established nickname of the city of Baltimore. One pair of unrelated terms may correspond to the nouns "Baltimore" and "Empire State Building." In another implementation, the second sampling module 506 can extract the negative instances of knowledge data (associated with the unrelated terms) in an on-demand manner during the training process in any of the ways described above, rather than, or in addition to, in the preliminary operation described above.

In one implementation, an instance of knowledge data, in whatever manner it is obtained, may contain the set of data: $\{L_1, L_2, d, f_1, f_2\}$. $L_1$ and $L_2$ represent the pair of linguistic items that are extracted from the structured knowledge resource, such as the pairs "Baltimore" and "Charm City," e.g., with $L_1$ serving as a proxy for a query and $L_2$ serving as a proxy for a document. d represents a distance between the two linguistic items. The optional $f_1$ and $f_2$ represent frequency measures associated with the first and second linguistic items respectively. The variables d, $f_1$, and $f_2$ may have different interpretations for different respective structured knowledge resources. In one case, the distance d may indicate the degree of relevance between the two linguistic items, established based on any metric. For example, in one merely illustrative case, the value d=1 may indicate that the linguistic items are assessed as being related in any of the ways described above (as in "Baltimore" and "Charm City"). The value d=0 may indicate that the linguistic items are assessed as being unrelated in any of the ways described above (as in "Baltimore" and "Empire State Building"). Each frequency measure may indicate how many times users have used a corresponding term in a search query, on prior occasions, as reflected in search log data maintained by a search engine. For example, the frequency measure for the term "Baltimore" may indicate the number of times that users have used that phrase in previous queries. Hence, in this example, the frequency information is the one piece of data that is not extracted from a structured knowledge resource itself; but in other cases, a structured knowledge resource may provide such information.

A conversion module 508 operates to convert the format of the sampled knowledge data to the format of the sampled user-behavioral data, to produce converted knowledge data. For example, in one case, the conversion module 508 may convert distance values having a value of 1 to click values having a value of 1, and distance values having a value of 0 to click values having a value 0. Similarly, the conversion module 508 may form a weight value by taking the average of the $f_1$ and $f_2$ values. In other cases, the TDCM 110 can operate without using the weight variable, e.g., by setting w=1 for all instances of the training data. A data store 510 stores the converted knowledge data.

As set forth above, the TDCM 110 can more generally can be said to convert the sampled knowledge data and the sampled user-behavioral data into a consistent format. In other cases, for instance, the TDCM 110 can perform the above conversion operation by converting the user-behavioral data into the same format as the knowledge data. In other cases, the TDCM 110 can perform the above conversion operation by converting the knowledge data and the user-behavioral data into a third common format, which differs from both the original knowledge data format the user-behavioral data format.

An integration module 512 integrates the consistent knowledge data with the consistent user-behavioral data to produce the master training data. In one implementation, the integration module 512 may perform this integration operation by integrating the converted knowledge data provided in the data store 510 with the sampled user-behavioral data provided in the data store 504. In performing this integration, the integration module 512 may create n duplicate instances of training data based on the value of the weight w variable associated with a particular instance of converted knowledge data or sampled user-behavioral data. For example, for an instance $\{L_1$=Baltimore, $L_2$=Charm City, c=1, w=5$\}$, the integration module 512 can create five copies of the instance $\{L_1, L_2, c\}$ in the set of master training data. In another implementation, the integration module 512 can retain the variable w in its original form, without performing the above-described duplication of instances. The training system 114 can then perform its training operation in a manner which takes the w variable into account. In other words, in that case, the w variable constitutes another piece of information that is used to train the model 106.

As noted above, in other implementations, the master training data can originally exclude the negative pairs associated with the user-behavior data and the knowledge data, such as the pair "Baltimore" and "Empire State Building." The training system 114 can generate the negative pairs in an on-demand manner during the training process. Such an implementation may reduce the storage requirements of the TDCM 110. As explained above, each unrelated pair can be randomly selected before the training process and/or in an on-demand manner during the training process, based on the assumption that the members of the pair will be unrelated; this default assumption will be valid in most cases. In addition, or alternatively, an unrelated pair can be generated before the training process and/or in an on-demand manner during the training process based on explicit information that indicates that the members of the pair are not related.

A.3. The Ranking System

Figure 7:
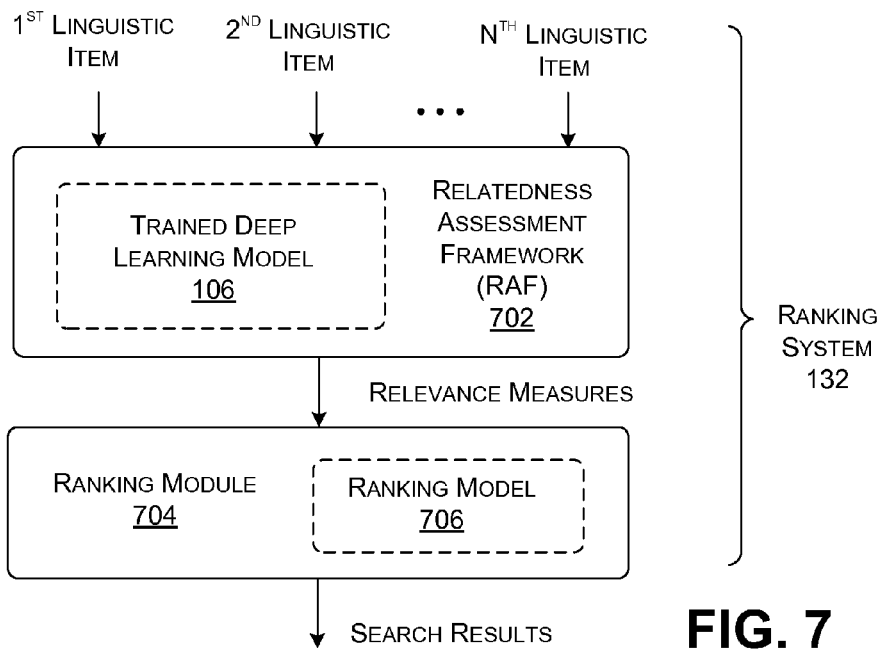
FIG. 7 shows one implementation of a ranking system, which is a component of the environment of FIG. 1.

FIG. 7 provides an overview of the ranking system 132, which is a component of the search engine 108 of FIG. 1. The ranking system 132 includes a relevance assessment framework (RAF) 702 and a ranking module 704. The RAF 702 uses the model 106 to determine the relatedness of one or more pairs of linguistic items. For example, assume that the user inputs a query, which may be referred to as a first linguistic item or an input linguistic item. The RAF 702 can use the model 106 to compare the query with a document, which may be referred to as a second linguistic item or an output linguistic item. In doing so, the RAF 702 computes a relevance measure for the query and the document, which expresses the relevance of the document to the query. In actual practice, the RAF 702 can compare the query with plural documents in successive fashion (one after the other), or in parallel.

For example, assume that the query corresponds to the phrase "Baltimore." Further assume that a first document constitutes the title "Charm City," and a second document constitutes the title "Empire State Building." If successfully trained, the RAF 702 will generate a relevance measure for the pairing ("Baltimore", "Charm City") which is higher than the relevance measure for the pairing ("Baltimore", "Empire State Building"); the assumption here is that relevance scores increase with increasing degrees of relevance, which need not be the case in all implementations.

The ranking module 704 may leverage a ranking model 706 to assign a ranking score to each output linguistic item (e.g., each document) under consideration. More specifically, the ranking model 706 can generate the ranking score based on the relevance measure for the output linguistic item (computed by the RAF 702), optionally together with any other factor(s). The ranking model 706 may implement any type of technique for generating a ranking score. For example, without limitation, the ranking model 706 may correspond to a machine-trained model which generates a ranking score based on a linear combination of different ranking features (where the relevance measure computed by the RAF 702 is one such feature). As a final process, the ranking module 704 can order the output linguistic items (e.g., documents) based on their computed ranking scores.

Figure 8:
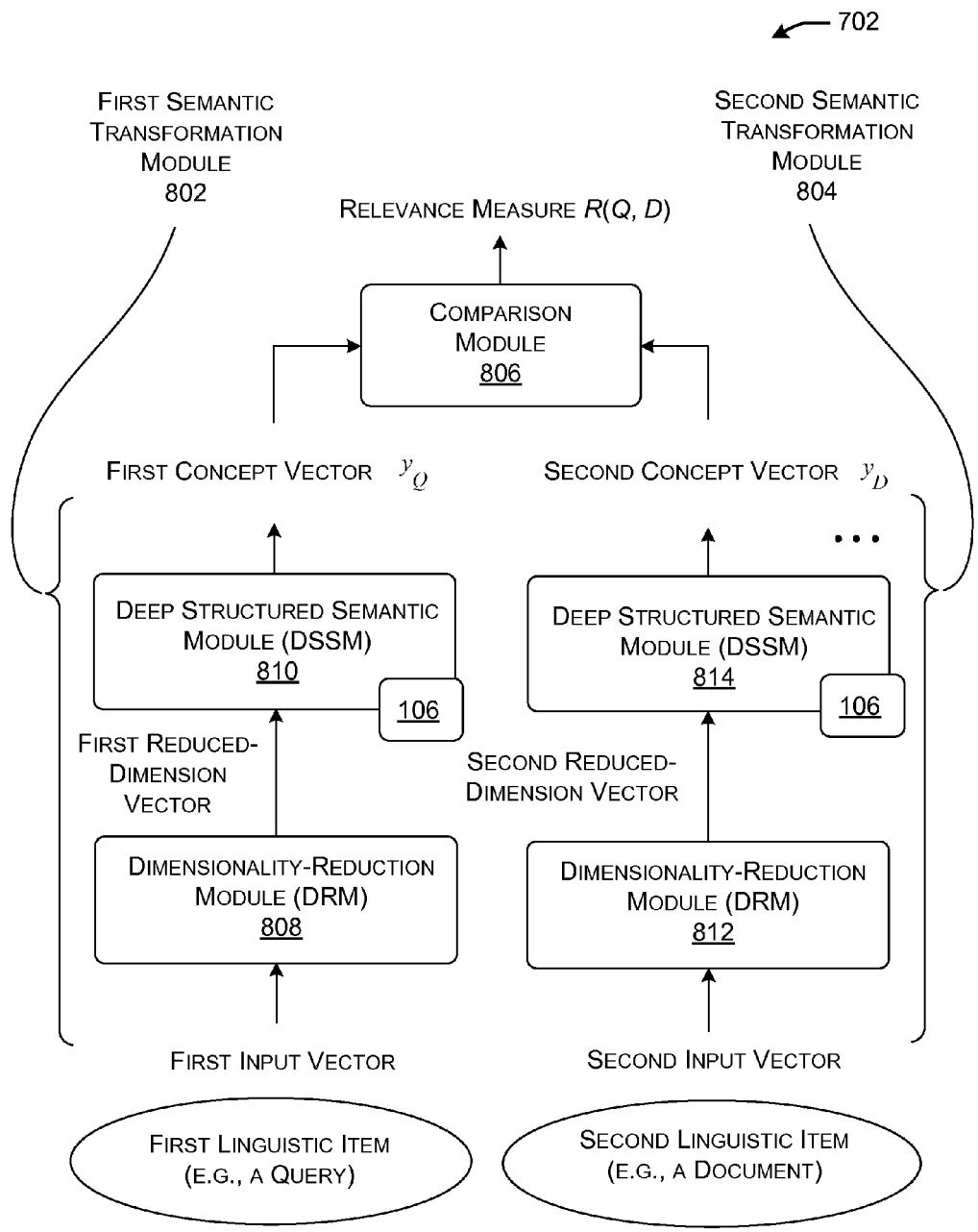
FIG. 8 shows one implementation of a relevance assessment framework (RAF), which is a component of the ranking system of FIG. 7. The RAF leverages the use of a deep learning model.

FIG. 8 shows one implementation of the RAF 702 for the particular case in which the model 106 corresponds to a deep learning model. More specifically, FIG. 8 depicts the RAF 702 as being applied to the task of comparing the relatedness of two linguistic items. As stated above, the first linguistic item may correspond to a query, while the second linguistic item may correspond to a document, etc. However, the RAF 702 is not limited to this illustrative application.

More specifically, FIG. 8 depicts the RAF 702 as including a first semantic transformation module 802 for processing the first linguistic item (e.g., a query), and a second semantic transformation module 804 for processing the second linguistic item (e.g., a document). Although not shown, the RAF 702 can include additional transformation modules for processing additional linguistic items (e.g., additional documents). Each transformation module uses an instantiation of the model 106 to map an input vector into an output concept vector. For example, the first transformation module 802 maps a first input vector, representing a first linguistic item (e.g., a query), into a first concept vector $y_Q$. The second transformation module 804 maps a second input vector, representing a second linguistic item (e.g., a document) into a second concept vector $y_D$. A "vector" corresponds to any information having two or more elements, associated with respective vector dimensions. A concept vector is expressed in a semantic space and reveals semantic information regarding the corresponding linguistic item from which it was derived. For example, the concept vector for the term "Baltimore" may reveal information that indicates that this term pertains to the nickname of Charm City.

In one case, the RAF 702 can actually provide two or more separate instances of transformation functionality to implement the plural transformation modules (802, 804) shown in FIG. 8. For example, the RAF 702 can provide two or more physical processing components associated with different instances of transformation functionality. Alternatively, or in addition, the RAF 702 can provide separate software-implemented instances of transformation functionality. Alternatively, or in addition, the RAF 702 can use a single instance of the transformation functionality to process separate input linguistic items in series, for example, by projecting the query into the semantic domain, and then projecting a set of documents into the semantic domain, one after the other.

A comparison module 806 can compare the query concept vector $y_Q$ with the document concept vector $y_D$, to produce a relevance measure. The relevance measure R(Q, D) provides an indication of the extent of a semantic relationship between the two concept vectors. Relevance may be defined in any environment-specific manner. In one case, for instance, the relevance measure indicates the degree of conceptual relevance of the query to a document under consideration. Two vectors that are close together in the semantic space pertain to the same or related concepts. Two vectors that are far apart in the semantic space refer to dissimilar concepts.

The transformation modules (802, 804) can be implemented in different ways. In one approach, the first transformation module 802 includes a dimensionality-reduction module (DRM) 808 and a deep structured semantic module (DSSM) 810. Similarly, the second transformation module 804 includes a DRM 812 and a DSSM 814. The DSSMs perform their functions based on respective instances of the deep learning model 106.

Each DRM receives an input vector which represents a linguistic item. For example, the DRM 808 receives an input vector which represents the query, while the DRM 812 receives an input vector that describes a particular document under consideration. The first DRM 808 produces a first reduced-dimension vector, while the second DRM 812 produces a second reduced-dimension vector. A reduced-dimension vector has a reduced dimensionality compared to its corresponding input vector, while still representing the same information expressed in the input vector.

Consider the operation of the DRM 808; other DRMs operate in the same manner. In one implementation, the DRM 808 reduces the dimensionality of its input vector using an n-gram hashing technique. For example, assume that the context corresponds to the phrase "automotive body shop," which may correspond, in turn, to a particular input query. The RAF 702 may initially represent this phase as an input vector having a number of dimensions (entries) equal to all the possible words that can be expressed in a natural language (such as English), including the words "automotive," "body," and "shop." The RAF 702 can set a value of 1 for the entries "automotive," "body," and "shop" in the input vector, and a value of 0 for all other entries in the vector. If a word appears multiple times in the input phrase, then the entry for that word will reflect the number of times that the word appears. In other words, the input vector described above provides a bag-of-words representation of the input phrase. As can be appreciated, the input vector will be very sparsely populated for most linguistic items.

The DRM 808 reduces the dimensionality of an input vector by first appending dummy tokens (e.g., the token "#") to the beginning and end of the input phrase under consideration, e.g., to produce "#automotivebodyshop#". The DRM 808 can then run an n-letter window over the input phrase to produce a series of n-grams. For example, if n=3, the DRM 808 produces the following sequence of trigrams, "#au", "aut", "uto", "tom", "omo", and so on, until the terminal dummy character is reached. The DRM 808 can then form a reduced-dimension vector having a number of dimensions corresponding to all the possible trigrams in particular language (with the possible exclusion of some uninteresting trigrams). In that vector, the DRM 808 can set the value of 1 for the trigrams entries that appear in the input phrase, e.g., by setting a 1 value for "#au", a 1 value for "aut," and so on, and a value of 0 for other entries. If a phrase includes multiple occurrences of the same trigram, then the corresponding entry in the reduced-dimension vector will indicate that number of occurrences of the trigram. Overall, there are many less unique trigrams than unique words in a language, so the reduced-dimension vector will have a much smaller dimensionality compared to the input vector.

In another implementation, the DRM 808 can first convert an input phrase into its phonetic representation (e.g., by expressing "cat" as "kat"), and then perform the above-described operations on the phonetic representation of the input phrase. For example, the DRM 808 can run an n-letter window over the phonetic version of the input phrase, and then form a reduced-dimension vector based on the trigrams which appear in the phonetic representation of the phrase.

Generally, it may be desirable to reduce the dimensionality of the input vectors for the purpose of performing training of the model 106 (in an offline phase of operation) in a more time-efficient and resource-efficient manner. The real-time operation of the RAF 702 can also operate more efficiently by using reduced-dimension vectors. In other cases, the RAF 702 can use other techniques to reduce the dimensionality of the input vectors (besides the above n-gram hashing technique), such as a random projection technique. In another case, the RAF 702 can entirely omit the use of DRMs, meaning that it operates on the original uncompressed input vectors.

Each DSSM projects an input reduced-dimension vector into a concept vector, using the model 106. More specifically, advancing to FIG. 9, this figure shows one implementation of the DSSM 810 of FIG. 8. The DSSM 814 of the second transformation module 804 has a similar construction and manner of operation, but is omitted from FIG. 9 to facilitate explanation.

Figure 9:
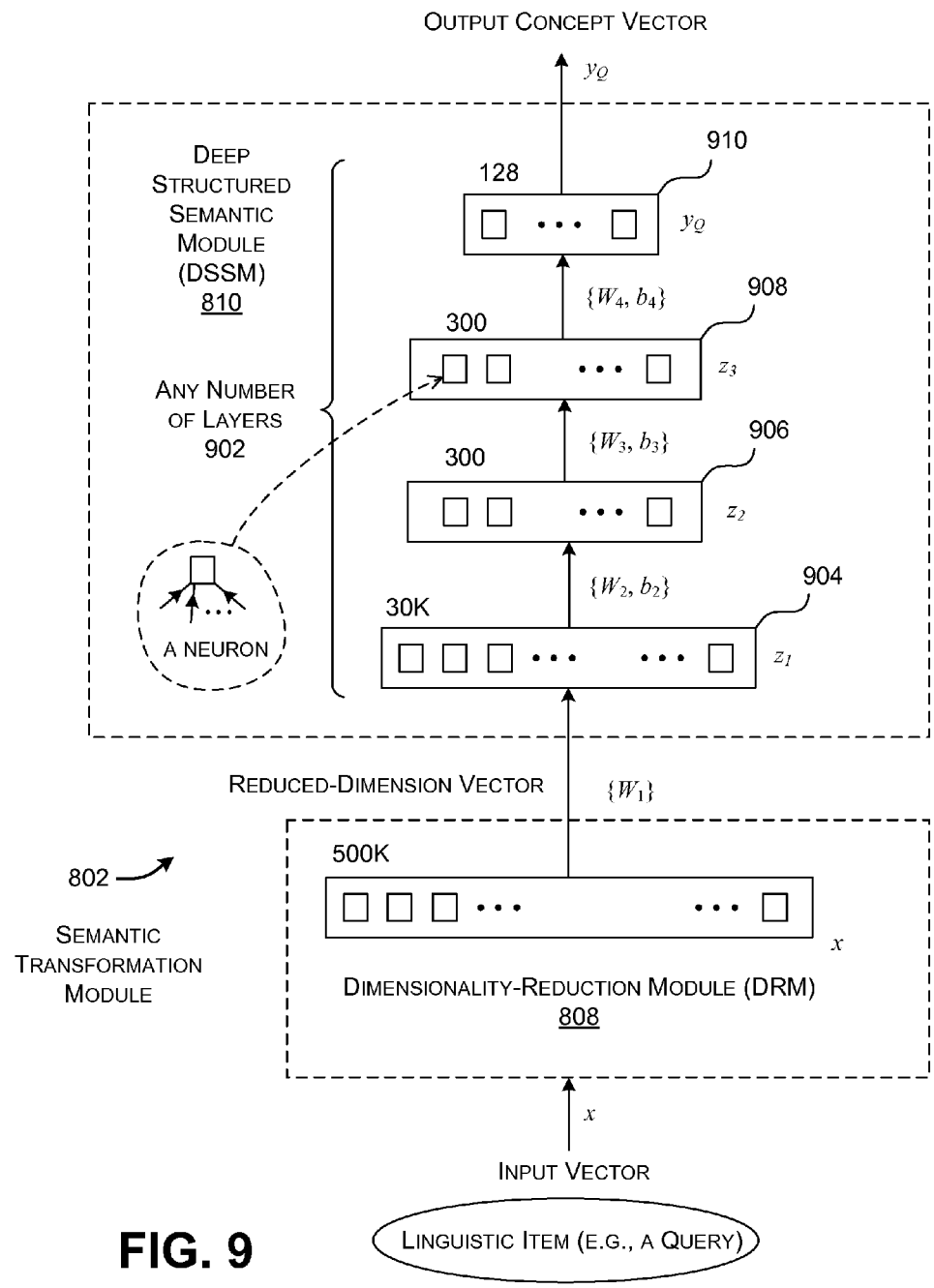
FIG. 9 shows one implementation of a semantic transformation module, which is a component of RAF of FIG. 8.

The DSSM 810 may be implemented as a deep neural network (DNN), composed of a plurality of layers 902. FIG. 9 specifically shows that the DSSM 810 includes four layers, but, more generally, the DSSM 810 can include any number of layers. Each layer, in turn, includes a plurality of elements, referred to as neurons. Each neuron stores a value. Each neuron, in a given layer, is furthermore connected to zero, one or more neurons in an immediately preceding layer (if any), and zero, one or more neurons in an immediately subsequent layer (if any). Here, "preceding" and "subsequent" refer to adjacent layers in relation to a direction of information flow through the DNN, which is from bottom to top in FIG. 9. That is, with respect to a given layer, preceding layers represent lower layers, while subsequent layers represent higher layers.

The layers 902 include a bottom most layer 904 for storing values, collectively denoted by the vector $z_1$. More specifically, the layer 904 represents the input to the DSSM 810, and therefore stores the values associated with the reduced-dimension vector provided by the DRM 808. A next layer 906 stores a vector $z_2$ having values that are derived from the values in the first layer, associated with the vector $z_1$. A next layer 908 stores a vector $z_3$ having values that are derived from the values in the layer 906, associated with the vector $z_2$. A final output layer 910 stores the concept vector y, having values that are derived from the values in the layer 908, associated with the vector $z_3$.

FIG. 9 also represents the various layers (904, 906, 908, 910) as boxes having different respective lengths to indicate that the different layers have different respective dimensionalities. Without limitation, in one implementation, the input vector x fed to the DRM 808 has a dimensionality of 500K, indicating that there are 500K possible words in an identified vocabulary. The layer 904 has a dimensionality of 30K. For instance, if a trigram hashing technique is used to produce the reduced-dimension vector, then the dimensionality of layer 904 means that there are 30K unique trigrams within the original corpus of 500K words (with the possible exclusion of some uninteresting trigrams). The layer 906 and the layer 908 each have a dimensionality of 300 elements. And the layer 910 has a dimensionality of 128 elements. To repeat, however, another implementation of the DSSM 810 can employ any number of layers, each of which can have any vector length.

More formally stated, in one implementation, the vector $z_1$ in the layer 904 can be expressed as $z_1 = W_1 x$, where $W_1$ represents whatever transformation is used by the DRM 808 to produce the lower-dimension vector. The vector $z_i$ in layers 906 and 908 may be expressed as $z_i = f(W_i z_{i-1} + b_i)$, for i=2, . . . N−1. And the vector y in the layer 910 may be expressed as $y = f(W_N z_{N-1} + b_N)$, where, in the specific example of FIG. 9, N=4. The symbol $W_i$ denotes the i-th weighting matrix produced by the training system 114 (of FIG. 1), and the symbol $b_i$ refers to an optional i-th bias term, also produced by the training system 114. The function $f(x)$, referred to as the activation function, can be formulated in different ways, such as the following tan h function:

$$f(x) = \frac{1 - e^{-2x}}{1 + e^{-2x}}. \tag{1}$$

Figure 10:
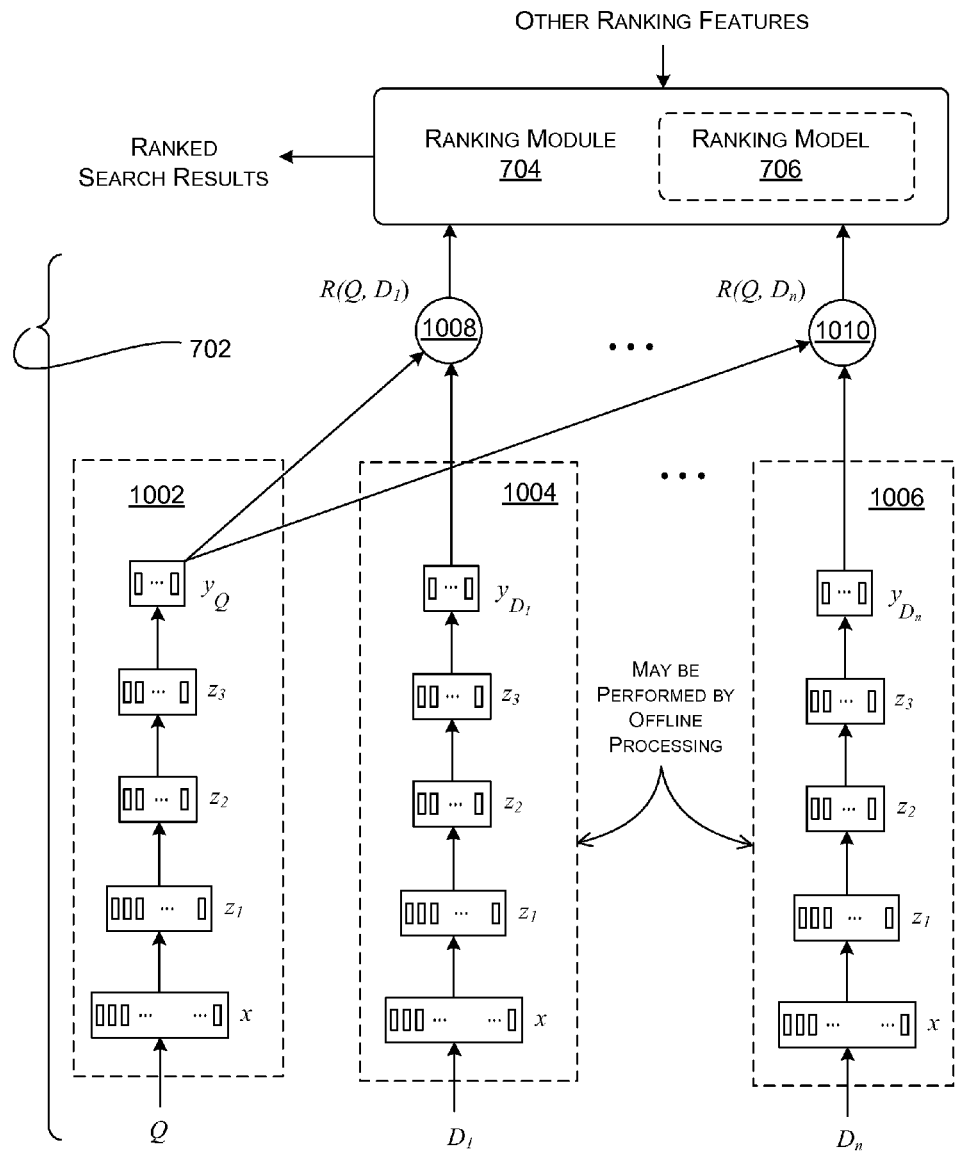
FIG. 10 shows one implementation of the overall RAF of FIG. 8.

FIG. 10 shows one overall implementation of the ranking system 132 of FIG. 7 that adopts the principles described above with reference to FIGS. 8 and 9. As shown there, a first transformation module 1002 produces a query concept vector $y_Q$ which expresses a query (Q), in a semantic space. A second transformation module 1004 produces a document concept vector $y_{D_1}$ which represents a document ($D_1$) in the same semantic space. A third transformation module 1006 produces another document concept vector $y_{D_n}$ which represents a document ($D_n$) in the same semantic space, and so on.

More specifically, the three (or more) transformation modules (1002, 1004, . . . , 1006) can be implemented by separate physical components or software instances. Or the three (or more) transformation modules (1002, 1004, . . . , 1006) can be implemented by a single physical component or software instance, which processes linguistic items in series, one after the other. Further, any of the document transformation modules (1004, . . . , 1006) can optionally perform their processing operations on their input linguistic items (e.g., on the candidate documents $D_1, \ldots, D_n$) as an offline process, that is, in advance of the user submitting the query Q.

A first comparison module 1008 determines the extent of a semantic relationship (e.g., similarity) between the query Q and the document $D_1$ in the semantic space, while a second comparison module 1010 determines the semantic relationship (e.g., similarity) between the query Q and the entity document $D_n$ in the semantic space. In one implementation, each comparison module can compute the semantic relationship (e.g., similarity) between the query Q and a document D as a cosine similarity measure, as follows:

$$R(Q, D) = \text{cosine}(y_Q, y_D) = \frac{y_Q^T y_D}{\|y_Q\| \|y_D\|}. \tag{2}$$

Other comparison techniques can be used instead of the cosine similarity determination technique, such as a Manhattan distance determination technique.

The ranking module 704 may receive the relevance measures produced by the comparison modules (1008, . . . , 1010). The ranking module 704 may then assign a ranking score to each candidate document based on the relevance measures, together with any other features. The ranking module 704 may use the ranking model 706 to perform the above task.

A.4. The Training System

Figure 11:
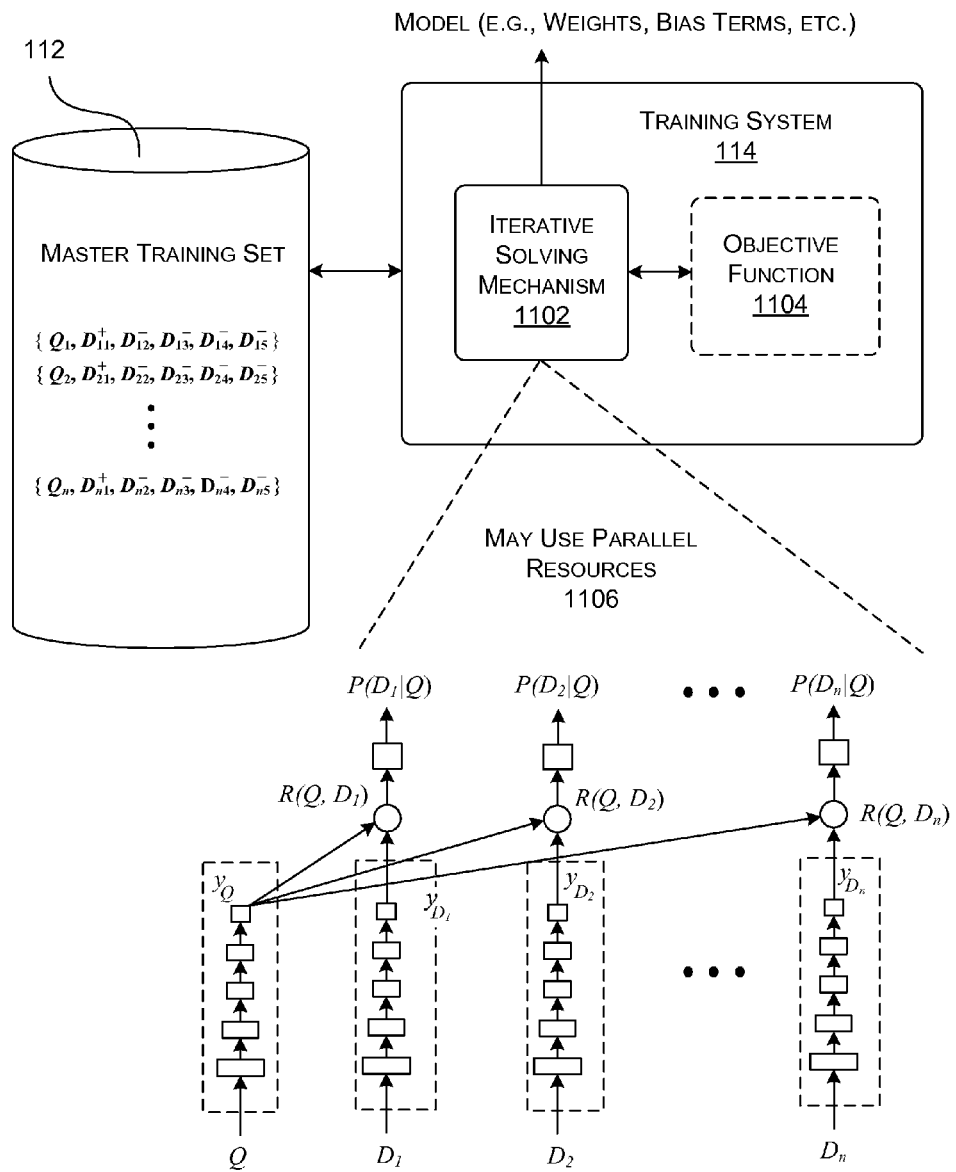
FIG. 11 shows one implementation of a training system, also shown in FIG. 1, for producing a deep learning model.

FIG. 11 shows one implementation of the training system 114 of FIG. 1. In one illustrative and non-limiting case, the training system 114 processes a corpus of the master training data (provided in a data store 112), to generate the model 106. The model 106 represents the collection of weighting matrixes ($W_i$) and bias factors ($b_i$) shown in FIG. 9. Collectively, the parameter values associated with the model 106 are referred to using the symbol $\Lambda$.

As described above, the master training data in the data store 112 originates from at least two sources: user-behavioral data and knowledge data. And as said, the user-behavioral data may correspond to click-through data. The term "click" is intended to have broad connotation. It may describe the case in which a user literally clicks on an entry using a mouse device. But the term click also encompasses the cases in which a user shows interest in an entry in any other manner.

However formed, the master training data encompasses a plurality of instances of training data, each constituting a training example. In one non-limiting implementation, each example includes a query Q, a document ($D^+$) that the user is presumed to have selected in response to the query, and at least one document ($D^-$) that the user did not select in response to the query. In the particular case of FIG. 11, a training example includes four non-clicked documents $\{D_2^-, D_3^-, D_4^-, D_5^-\}$, but a training example can include any number of such documents.

More specifically, some training examples may originate from user-behavioral data, while other training examples may originate from knowledge data. In some cases, some training examples may also represent data pulled from both user-behavioral data and knowledge data. Accordingly, a "clicked" document ($D^+$) may, in some cases, correspond to an actual document that the user has clicked on in response to the query Q. In other cases, a "clicked" document may correspond to a linguistic item extracted from a structured knowledge resource, which serves as a proxy for a user click in response to the query Q (where, in that case, the query Q corresponds to another linguistic item extracted from the structured knowledge resource). In some cases, a negative document ($D^-$) may indicate that the user was given an opportunity to select the document, but declined to do so; in other cases, a negative document may simply indicate that the user did not select this particular document in response to submitting the query Q, regardless of whether the user was ever given the opportunity to select the document. In still other cases, a negative document may correspond to a linguistic item, that is unrelated to the query Q, and which is extracted from a structured knowledge resource in any of the ways described above. Further, as previously explained, in some cases, the TDCM 110 can generate the negative documents in any manner prior to the start of the actual model training process; alternatively, or in addition, the TDCM 110 can generate the negative document in any manner during the course of the training process.

The training system 114 operates by using an iterative solving mechanism 1102 to iteratively achieve an objective defined by an objective function 1104, by iteratively changing the parameter values of the model $\Lambda$. When the iterative processing is finished, the final parameter values constitute the trained model $\Lambda$. The objective function 1104, in turn, mathematically expresses an aim which the model $\Lambda$ seeks to achieve, when fully trained. In the present case, the objective function stipulates that the conditional likelihood of the clicked documents, given respective queries, is to be maximized, and the conditional likelihood of non-clicked documents, given the queries, is to be reduced. In other words, the objective function attempts to make the assessed relevance of clicked documents as high as possible, while simultaneously attempting to make the assessed relevance of non-clicked documents as low as possible. As explained above, note that a clicked document, for some training examples, may represent information extracted from a structured knowledge resource, rather than a document that a user literally clicked on; in other words, that information serves as a proxy for a clicked document.

To mathematically derive the objective function, first note that the probability P(D|Q) of a clicked document ($D^+$) in a training example, given a query Q, can first be expressed as a softmax function as follows:

$$P(D^+ | Q) = \frac{\exp(\psi R_\Lambda(Q, D^+))}{\sum_{D' \in D} \exp(\psi R_\Lambda(Q, D'))}. \quad (3)$$

The term $R_\Lambda(Q, D+)$ represents the semantic relationship (e.g., similarity) between the query Q and the clicked document $D^+$ in the semantic space, for a given current selection of parameters associated with a model $\Lambda$. The term D represents the set of five documents in the training instance, including $D^+$ and the four non-clicked documents, although, as stated above, a training example can include any number of non-clicked documents. The term $R_\Lambda(Q, D')$ represents the semantic relationship (e.g., similarity) between the query Q and one of the documents (D') in the training example, in the semantic space. The symbol $\psi$ represents an empirically-derived smoothing factor (e.g., which can be generated by analyzing a held-out dataset of training examples). For this individual training example, the objective function will express an attempt to make R ($Q, D^+$) as high as possible, and each R ($Q, D^-$) as low as possible, to overall make P ($D^+|Q$) as high as possible, and each P($D^-|Q$) as low as possible.

Overall, when considering all of the training instances in the corpus of mast training data, the objective function involves attempting to maximize the conditional likelihood of the clicked documents given the corresponding queries, or equivalently, minimize the following loss equation:

$$L(\Lambda) = -\log \prod_{(Q,D^+)} P(D^+ | Q). \quad (4)$$

In other words, the objective is to derive a set of parameter values that minimizes the above equation, with respect to all of the examples in the master training data, or some subset thereof.

In one approach, the iterative solving mechanism 1102 uses a gradient-based numerical optimization algorithm to solve the above problem, such as a gradient descent technique. The iterative solving mechanism 1102, for instance, can apply the following update rule to perform the optimization:

$$\Lambda_t = \Lambda_{t-1} - \epsilon_t \frac{\partial L(\Lambda)}{\partial \Lambda}\Big|_{\Lambda=\Lambda_{t-1}}. \quad (5)$$

Here, $\Lambda_t$ and $\Lambda_{t-1}$ are the models at the $t^{th}$ and $t-1^{th}$ iteration, respectively, and $\epsilon_t$ is a learning rate parameter. From a high-level perspective, the iterative solving mechanism 1102 makes a large change in the model $\Lambda$ whenever the model $\Lambda$ is changing by a relatively large amount from iteration to iteration, and makes a smaller change in the model $\Lambda$ whenever the model $\Lambda$ is changing by a slower amount.

More specifically, assume that there are M training examples in the master training data. The $m^{th}$ training example is $(Q_m, D_m^+)$, corresponding to a particular pairing of a query $(Q_m)$ and a document $(D_m^+)$ that has been clicked in response to the query. The loss function for that individual training instance is:

$$L_m(\Lambda) = -\log P(D_m^+|Q_m) \quad (6).$$

The derivative of the loss function as a whole can therefore be expressed as:

$$\frac{\partial L(\Lambda)}{\partial \Lambda} = \sum_{m=1}^{M} \frac{\partial L_m(\Lambda)}{\partial \Lambda}. \quad (7)$$

The term $$\frac{\partial L_m(\Lambda)}{\partial \Lambda}$$

can be derived as follows. To simplify the notation, the subscript m will be omitted in the following. First, the loss function derived above can be expressed as follows:

$$L(\Lambda) = \log(1 + \Sigma_j \exp(-\psi \Delta_j)) \quad (8),$$

where $\Delta_j = R(Q, D^+) - R(Q, D_j^-)$. The gradient of the loss function with respect to the $N^{th}$ weight matrix $W_N$ is:

$$\frac{\partial L(\Lambda)}{\partial W_N} = \sum_j \alpha_j \frac{\partial \Delta_j}{\partial W_N}, \quad (9)$$

where:

$$\frac{\partial \Delta_j}{\partial W_N} = \frac{\partial R(Q, D^+)}{\partial W_N} - \frac{\partial R(Q, D_j^-)}{\partial W_N}, \quad (10)$$

and $$\alpha_j = \frac{-\psi \exp(-\psi \Delta_j)}{1 + \sum_{j'} \exp(-\psi \Delta_{j'})}. \quad (11)$$

Now, let $z_{i,Q}$ and $Z_{i,D}$ refer to the activation in the hidden layer i for a query Q and document D, respectively. And let $y_Q$ and $y_D$ refer to the output activation for the output layer 910 for query Q and document D, respectively. Further, to simplify the following notation, let a, b, and c correspond to $y_Q^T Y_D$, $1/\|y_Q\|$, and $1/\|y_D\|$, respectively. Finally, assume that the activation function used by the model corresponds to the tan h function described above in Equation (1). With those definitions, each term in the right-hand side of Equation (10) can be calculated for the pair (Q, D) using the following formula:

$$\frac{\partial R(Q, D)}{\partial W_N} = \frac{\partial}{\partial W_N} \frac{\gamma_Q^T \gamma_D}{\|\gamma_Q\|\|\gamma_D\|} = \delta_{\gamma_Q}^{(Q,D)} Z_{N-1,Q}^T + \delta_{\gamma_D}^{(Q,D)} Z_{N-1,D}^T \quad (12)$$

where:

$$\delta_{y_Q}^{(Q,D)} = (1 - y_Q) \circ (1 + y_Q) \circ (bcy_D - acb^3 y_Q) \quad (13)$$

and $$\delta_{y_D}^{(Q,D)} = (1 - y_D) \circ (1 + y_D) \circ (bcy_Q - abc^3 y_D) \quad (14).$$

In the above equations, the operation $\circ$ is an element-wise multiplication (i.e., a Hadamard product).

The values $\{\delta\}$ for each successive hidden layer can be computed through back projection as follows:

$$\delta_{i,Q}^{(Q,D)} = (1 + z_{i,Q}) \circ (1 - z_{i,Q}) \circ W_i^T \delta_{i+1,Q}^{(Q,D)} \quad (15)$$

and $$\delta_{i,D}^{(Q,D)} = (1 + z_{i,D}) \circ (1 - z_{i,D}) \circ W_i^T \delta_{i+1,D}^{(Q,D)} \quad (16)$$

Correspondingly, the gradient of the loss function with respect to an intermediate weight matrix $W_i$, $i=2, \ldots, N-1$, can be computed as:

$$\frac{\partial L(\Lambda)}{\partial W_i} = \sum_j \alpha_j \frac{\partial \Delta_j}{\partial W_i}, \quad (17)$$

where $$\frac{\partial \Delta_j}{\partial W_i}$$

is equal to:

$$\left(\delta_{i,Q}^{(Q,D^+)} Z_{i-1,Q}^T + \delta_{i,D^+}^{(Q,D^+)} Z_{i-1,D^+}^T\right) - \begin{pmatrix} \delta_{i,Q}^{(Q,D_j^-)} Z_{i-1,Q}^T + \\ \delta_{i,D_j^-}^{(Q,D_j^-)} Z_{i-1,D_j^-}^T \end{pmatrix}. \quad (18)$$

The iterative solving mechanism 1102 can apply the above equations in successive back-projection and forward phases of analyses (using the above-described equations) until the DNN accurately models the behavior expressed in the master training data, within a desired degree of tolerance. That is, the iterative process entails computing the activations of the neurons in a forward phase of analysis, computing error terms in the neurons in the output layer, back-propagating the error terms to the other layers of the neural network, updating the model weights based on the error terms, and repeating the above operations. The bias factors $b_i$ can be derived using the same approach described above.

The training system 114 can perform the above-described processing using parallel processing resources 1106. The parallel processing resources 1106 can be implemented in any manner, e.g., using hardware units, software units, or a combination thereof. For example, the training system 114 can use an architecture that is similar to that shown in FIG. 10. Each separate processing unit, in whatever manner implemented, can include a dimensionality-reduction module (DRM) for calculating a reduced-dimension vector associated with a document D, a deep structured semantic module (DSSM) for generating a document concept vector $y_D$ in the semantic space, a comparison module for generating the relevance measure R(Q, D), and a softmax module for generating P(Q|D). Another processing unit can generate a representation $y_Q$ of the query Q in the semantic space.

To repeat, Section A has described the model 106 as a specific type of deep learning model. However, the model 106 can be implemented as another type of deep learning model (such as a convolutional model, etc.), or a model that is not characterized as a deep learning model (such as a decision tree model, etc.).

B. Illustrative Processes

Figure 12:
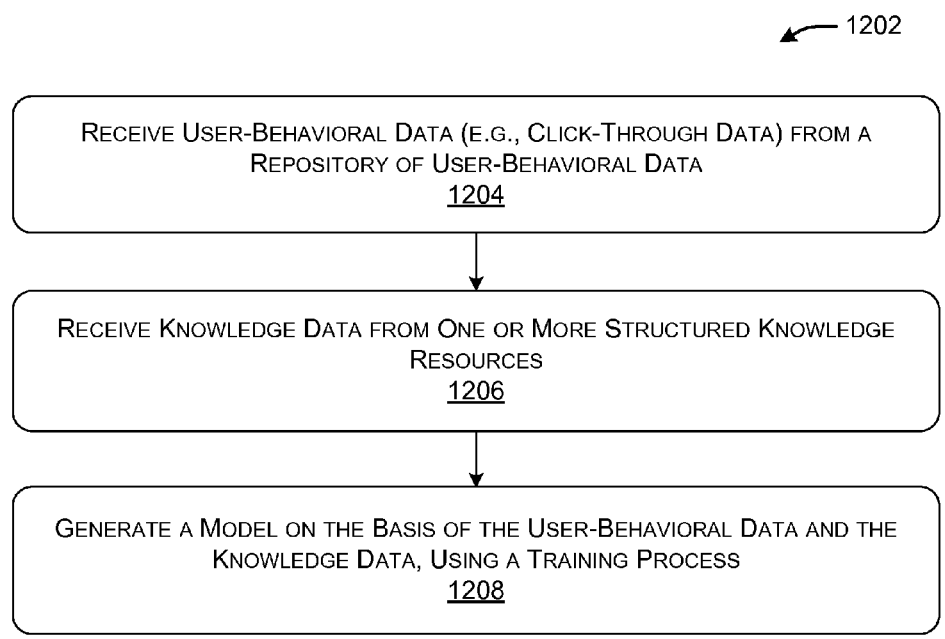
FIG. 12 is a flowchart that provides an overview of one way of producing a model based on user-behavioral data and click-through data.
Figure 13:
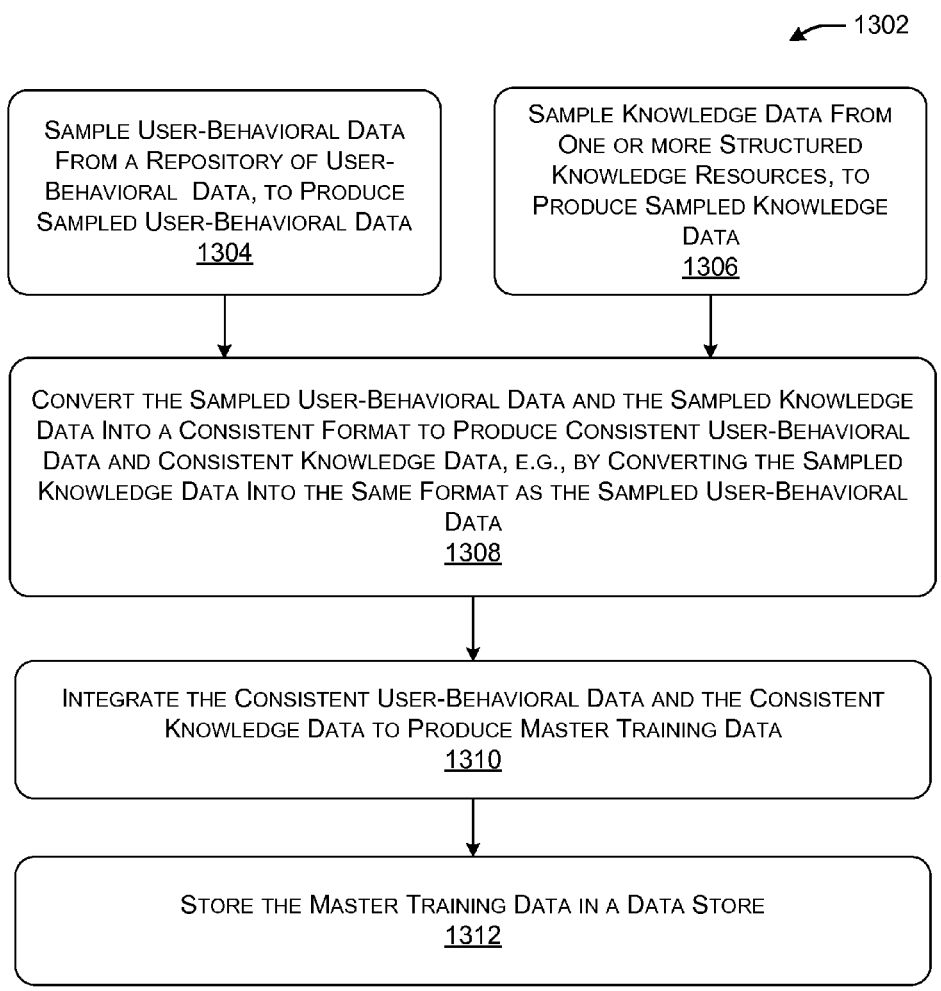
FIG. 13 is a flowchart that explains one way of producing master training data on the basis of user-behavioral data and knowledge data.
Figure 14:
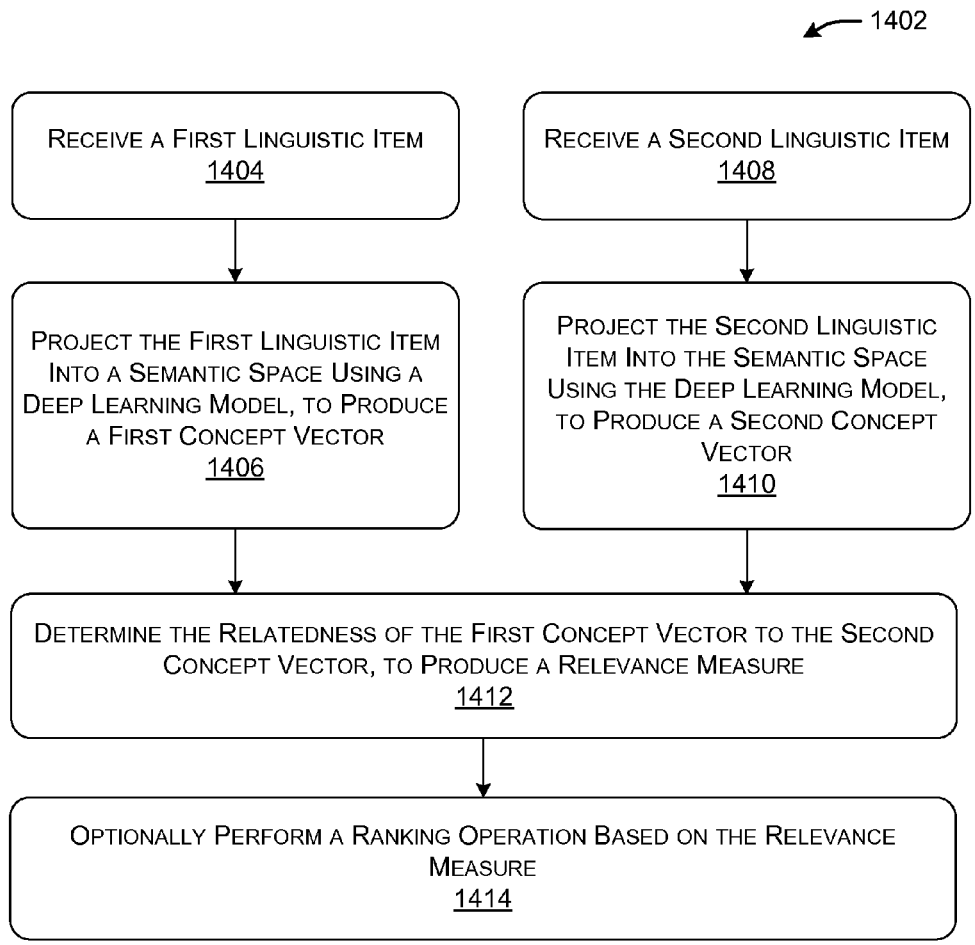
FIG. 14 is a flowchart that shows one way of applying a model, produced according to the flowcharts of FIGS. 12 and 13, in a search engine.

FIGS. 12-14 explain the environment 102 of FIG. 1 in flowchart form. Since the principles underlying the operation of the environment 102 have already been described in Section A, certain operations will be addressed in summary fashion in this section.

Starting with FIG. 12, this figure shows a procedure 1202, implemented by training framework 104, for generating a model 106. In block 1204, the training framework 104 receives user-behavioral data from a repository 122 of user-behavioral data. In one case, the user-behavioral data identifies queries submitted by users together with selections made by the users in response to the queries. In block 1206, the training framework 104 receives knowledge data from one or more structured knowledge resources. The knowledge data representing relationships among linguistic items, which, in some cases, may be specified by experts, crowd-sourcing workers, etc. In block 1208, the training framework 104 generates a model 106 on the basis of the user-behavioral data and the knowledge data, using a machine-learning training process. In one case, the model 106 is a deep learning model. The deep learning model is configured to project input linguistic items into concept vectors expressed in a semantic space.

More specifically, in one case, the training system 114 first produces a provisional model 116. A validation system 118 uses the provisional model 116 to determine relevance measures for pairs in a validation data set, for the purpose of determining whether the provisional model 116 provides sufficiently accurate results. If not, the training system 114 may repeat its training operation with respect to additional training data and/or different parameter settings, etc. The validation data represents pairings of linguistic items having known relationships. The validation data set can be produced in any manner. For example, in one case, the validation data set may represent synonymous nouns extracted from a structured knowledge resource, such as the WordNet knowledge resource. Or the validation data set may represent pairs of terms that are manually labeled by humans.

The validation system 118 can use any type of validation analysis. For example, the validation system 118 can generate the type of histogram shown in FIGS. 2 and 3 by using the provisional model 116 to analyze the pairs in the validation data set. The resultant distribution of relevance measures indicates whether the model 116 is producing the type of performance shown in FIG. 2 (which is not desirable) or the type of performance shown in FIG. 3 (which is desirable). In other cases, the validation system 118 can assess the performance of the provisional model 116 using other techniques, such as by assessing the area under the curve (AUC) in a receiver operating characteristic (ROC) analysis.

FIG. 13 shows a procedure 1302 that explains one way of producing master training data on the basis of user-behavioral data and knowledge data. In block 1304, the training data compilation module (TDCM) 110 samples user-behavioral data from the repository 122 of user-behavioral data, to produce sampled user-behavioral data. In block 1306, the TDCM 110 samples knowledge data from one or more structured knowledge resources, to produce sampled knowledge data. In block 1308, the TDCM 110 converts the sampled user-behavioral data and the sampled knowledge data into a consistent format, to produce consistent user-behavioral data and consistent knowledge data. In one approach, the TDCM 110 can perform block 1308 by converting the sampled knowledge data into the same format the sampled user-behavioral data. In block 1310, the TDCM 110 integrates the consistent user-behavioral data with the consistent knowledge data, to produce master training data. In block 1312, the TDCM 110 stores the master training data in a data store 112.

FIG. 14 shows a procedure 1402 that explains one way of applying a deep learning model in the search engine 108. In block 1404, the ranking system 132 receives a first linguistic item (such as a query). In block 1406, the ranking system 132 converts the first linguistic item into a first concept vector, expressed in a high-level semantic space. In block 1408, the ranking system 132 receives a second linguistic item (such as a document). In block 1410, which can be performed offline (in advance of receiving the query), the ranking system 132 converts the second linguistic item into a second concept vector, expressed in the same linguistic space. In block 1412, the ranking system 132 determines the degree of relevance between the first concept vector and the second concept vector, as expressed by a relevance measure. In block 1414, the ranking system 132 optionally performs a ranking operation based on the relevance measure, optionally together with other ranking factors. Overall, the ranking system 132 may perform the procedure 1402 with respect to a plurality of documents; in that context, in block 1414, the ranking system 132 ranks the documents based on their respective relevance measures.

As a closing note, this description has described different ways of performing certain functions and implementing certain mechanisms. These different techniques/mechanisms can also be combined together in any manner, rather than applied in the alternative. To cite one example, the pairs of unrelated linguistic items can be generated using any of various techniques described above, but can also be generated based on any combination of these techniques (e.g., by applying any two or more of the techniques described above).

C. Representative Computing Functionality

FIG. 15 shows computing functionality 1502 that can be used to implement any aspect of the environment 102 of FIG. 1. For instance, the type of computing functionality 1502 shown in FIG. 15 can be used to implement any aspect of the training data compilation module (TDCM) 110, any aspect of the training system 114, any aspect of the validation system 118, any aspect of the search system 108, any aspect of any user device, and so on. In all cases, the computing functionality 1502 represents one or more physical and tangible processing mechanisms.

The computing functionality 1502 can include one or more processing devices 1504, such as one or more central processing units (CPUs), and/or one or more graphical processing units (GPUs), and so on.

The computing functionality 1502 can also include any storage resources 1506 for storing any kind of information, such as code, settings, data, etc. Without limitation, for instance, the storage resources 1506 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removal component of the computing functionality 1502. The computing functionality 1502 may perform any of the functions described above when the processing devices 1504 carry out instructions stored in any storage resource or combination of storage resources.

As to terminology, any of the storage resources 1506, or any combination of the storage resources 1506, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1502 also includes one or more drive mechanisms 1508 for interacting with any storage resource, such as a hard disk drive mechanism, an optical disk drive mechanism, and so on.

The computing functionality 1502 also includes an input/output module 1510 for receiving various inputs (via input devices 1512), and for providing various outputs (via output devices 1514). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 1516 and an associated graphical user interface (GUI) 1518. Other output devices include a printer, a model-generating mechanism, a tactile output mechanism, an archival mechanism (for storing output information), and so on. The computing functionality 1502 can also include one or more network interfaces 1520 for exchanging data with other devices via one or more communication conduits 1522. One or more communication buses 1524 communicatively couple the above-described components together.

The communication conduit(s) 1522 can be implemented in any manner, e.g., by a local area network, a wide area network (e.g., the Internet), point-to-point connections, etc., or any combination thereof. The communication conduit(s) 1522 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1502 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by one or more computing devices, the method comprising:
   sampling first click-through data from a repository, the first click-through data identifying queries submitted by users to a search engine and specific result items that the users clicked from search results provided by the search engine in response to the queries;
   sampling structured knowledge data from one or more structured knowledge resources, the structured knowledge data providing semantic distances between various nouns identified in the one or more structured knowledge resources;
   processing the structured knowledge data to obtain second click-through the data second click-through data representing respective semantic distances between semantically related nouns as corresponding click values; and
   training a model using the first click-through data and the second click-through data as training data, the model being trained using a machine-learning training process,
   wherein the model is configured to process input linguistic items and identify output linguistic items that are related to the input linguistic items.

2. The method of claim 1, wherein each instance of the first click-through data represents at least a particular query, an answer to the particular query, and an associated click value that indicates whether a user selected the answer in response to the particular query.

3. The method of claim 1, wherein each instance of the structured knowledge data comprises at least one frequency measure associated with a pair of semantically related nouns.

4. The method of claim 1, wherein the structured knowledge data includes:
   a first subset of instances that represent pairs of semantically related nouns, and
   a second subset of instances that represent pairs of unrelated nouns.

5. The method of claim 1, wherein the click values that represent the respective semantic distances between the semantically related nouns are positive numerical values.

6. The method of claim 5, the positive numerical values being one, wherein the click values represent respective semantic distances between unrelated nouns as zero.

7. The method of claim 1, wherein the model is configured to map the input linguistic items and the output linguistic items into a semantic space.

8. The method of claim 7, wherein the model comprises a neural network.

9. The method of claim 8, wherein training the neural network comprises:
iteratively adjusting neural network parameters according to a result of an objective function.

10. The method of claim 9, wherein the objective function maximizes a conditional likelihood of clicked linguistic items given respective input linguistic items and minimizes a conditional likelihood of non-clicked linguistic items given the respective input linguistic items.

11. A computer readable storage medium storing computer readable instructions, the computer readable instructions providing a semantic transformation module when executed by one or more processing devices, the computer readable instructions comprising:
logic configured to:
use a deep learning model to map an input linguistic item into a concept vector in a high-level conceptual space; and
identify, in the high-level conceptual space, one or more output linguistic items that are related to the input linguistic item,
the deep learning model capturing semantic relationships learned in a machine-learning training process performed on training instances of user-behavioral data and other training instances of structured knowledge data,
the training instances of user-behavioral data identifying user-submitted linguistic items submitted by users to a search engine together with user clicks made by the users on user-clicked result items provided by the search engine in response to the user-submitted linguistic items, and
the other training instances of structured knowledge data representing semantic distances between nouns expressed by one or more structured knowledge resources as corresponding click values.

12. A computer system, comprising:
a processing device; and
a storage resource storing instructions which, when executed by the processing device, cause the processing device to implement:
a search engine configured to receive an input linguistic item, and configured to identify at least one output item that has been determined to be relevant to the input linguistic item,
the search engine being configured to identify said at least one output item using a model configured to map the input linguistic item and the at least one output item into a semantic space,
the model being trained by a machine-learning training process based at least on user-behavioral training data and structured knowledge training data,
the user-behavioral training data identifying user-submitted linguistic items submitted by users together with user clicks made by the users on specific result items provided by a search engine in response to the user-submitted linguistic items, and
the structured knowledge training data representing, as corresponding click values, semantic distances between semantically-related nouns, expressed by one or more structured knowledge resources.

13. The computer system of claim 12, wherein the instructions, when executed by the processing device, cause the processing device to:
train the model based at least on the user-behavioral training data and the structured knowledge training data.

14. The computer system of claim 13, wherein the instructions, when executed by the processing device, cause the processing device to:
access structured knowledge data in the one or more structured knowledge resources, the structured knowledge data identifying the semantic distances; and
perform a conversion of the structured knowledge data to obtain the structured knowledge training data, the conversion involving associated individual click values with pairs of nouns identified in the structured knowledge data.

15. The computer system of claim 14, wherein the user-behavioral training data comprises multiple instances, and each instance of the user-behavioral training data represents at least a particular query, a particular answer to the particular query, and a corresponding click value that indicates whether a user selected the particular answer in response to the particular query.

16. The computer system of claim 14, wherein the structured knowledge training data comprises multiple instances, and each instance of the structured knowledge training data represents at least a pair of nouns, a corresponding click value that represents a degree of semantic relatedness between the pair of nouns as identified by the one or more structured knowledge resources, and at least one frequency measure associated with the pair of nouns.

17. The computer system of claim 14, wherein the model is configured to determine relevance measures reflecting relevance of multiple output items to the input linguistic item.

18. The computer system of claim 17, wherein the instructions, when executed by the processing device, cause the processing device to:
rank individual output items based at least on the relevance measures.

19. The computer system of claim 12, wherein the model corresponds to a deep learning model that uses a multi-layer neural network to project the input linguistic item into a concept vector expressed in a semantic space.

20. The computer system of claim 12, wherein the model corresponds to any type of model other than a deep learning model.

* * * * *